(12) United States Patent
Kleppmann et al.

(10) Patent No.: US 9,794,203 B2
(45) Date of Patent: Oct. 17, 2017

(54) COMMUNICATION SYSTEMS AND METHODS

(71) Applicant: LinkedIn Corporation, Mountain View, CA (US)

(72) Inventors: Martin Kleppmann, Mountain View, CA (US); Rahul Vohra, Mountain View, CA (US); Conrad Irwin, Mountain View, CA (US); Lee Mallabone, San Francisco, CA (US); Sam Stokes, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 410 days.

(21) Appl. No.: 13/708,407

(22) Filed: Dec. 7, 2012

(65) Prior Publication Data

US 2014/0164478 A1    Jun. 12, 2014

Related U.S. Application Data

(63) Continuation of application No. 13/708,055, filed on Dec. 7, 2012.

(51) Int. Cl.
*G06F 15/16* (2006.01)
*H04L 12/58* (2006.01)
(Continued)

(52) U.S. Cl.
CPC ........ *H04L 51/08* (2013.01); *H04L 29/08072* (2013.01); *H04L 51/063* (2013.01); *H04L 51/066* (2013.01); *H04L 51/32* (2013.01); *H04L 63/0281* (2013.01); *H04L 67/2804* (2013.01); *H04L 63/08* (2013.01)

(58) Field of Classification Search
USPC ......... 709/206, 225, 205; 705/318; 707/737; 715/733, 833, 720, 750
See application file for complete search history.

(56) References Cited

U.S. PATENT DOCUMENTS 6,029,195 A    2/2000 Herz
6,263,505 B1   7/2001 Walker et al.
(Continued)

FOREIGN PATENT DOCUMENTS

CN    101114370 A    1/2008
CN    101808153 A    8/2010
(Continued)

OTHER PUBLICATIONS

"U.S. Appl. No. 13/708,055, Response filed Dec. 12, 2014 to Non Final Office Action mailed Sep. 12, 2014", 9 pgs.
(Continued)

*Primary Examiner* — Tammy Nguyen
(74) *Attorney, Agent, or Firm* — Schwegman Lundberg & Woessner, P.A.

(57) ABSTRACT

Example communication systems and methods are described. In one implementation, a method receives a message from a message server and identifies a network link contained in the received message. The network link is associated with shareable content. The received message is modified to indicate, to a user of a client device, an option to share the network link with at least on recipient. The modified message is then communicated to the client device.

20 Claims, 21 Drawing Sheets

(51) Int. Cl.
*H04L 29/08* (2006.01)
*H04L 29/06* (2006.01)

(56) References Cited

U.S. PATENT DOCUMENTS

| | | | |
|---|---|---|---|
| 6,505,175 B1 | 1/2003 | Silverman et al. | |
| 6,873,982 B1* | 3/2005 | Bates | G06F 17/30648 |
| | | | 707/737 |
| 7,107,240 B1 | 9/2006 | Siiverman et al. | |
| 7,890,860 B1 | 2/2011 | Thrasher et al. | |
| 8,032,121 B2 | 10/2011 | Kwon et al. | |
| 8,131,281 B1 | 3/2012 | Hildner et al. | |
| 8,613,070 B1 | 12/2013 | Borzycki et al. | |
| 9,092,523 B2 | 7/2015 | Tanne et al. | |
| 9,116,654 B1 | 8/2015 | Shah | |
| 9,639,316 B2* | 5/2017 | Mizoguchi | G06F 3/1285 |
| 2001/0018771 A1 | 8/2001 | Walker et al. | |
| 2003/0154244 A1* | 8/2003 | Zellers | H04L 29/06 |
| | | | 709/203 |
| 2004/0237026 A1 | 11/2004 | Aust | |
| 2005/0114759 A1* | 5/2005 | Williams | G06Q 10/10 |
| | | | 715/221 |
| 2006/0004703 A1* | 1/2006 | Spivack | G06F 17/3089 |
| 2006/0136381 A1* | 6/2006 | Glaser | G06F 17/30864 |
| 2007/0061423 A1 | 3/2007 | Accapadi et al. | |
| 2007/0100999 A1* | 5/2007 | Haider | G06Q 10/107 |
| | | | 709/225 |
| 2007/0192423 A1 | 8/2007 | Karlson | |
| 2007/0245245 A1 | 10/2007 | Blue et al. | |
| 2007/0250576 A1* | 10/2007 | Kumar | G06Q 10/107 |
| | | | 709/206 |
| 2008/0189373 A1 | 8/2008 | Ikonen et al. | |
| 2009/0043593 A1* | 2/2009 | Herbrich | G06Q 30/0185 |
| | | | 705/318 |
| 2009/0182823 A1 | 7/2009 | O'sullivan et al. | |
| 2009/0222333 A1 | 9/2009 | Rivas | |
| 2009/0292776 A1 | 11/2009 | Nesbitt et al. | |
| 2010/0246785 A1 | 9/2010 | Wang et al. | |
| 2010/0246791 A1 | 9/2010 | Wang et al. | |
| 2010/0273447 A1 | 10/2010 | Mann et al. | |
| 2011/0047484 A1* | 2/2011 | Mount | G06Q 10/10 |
| | | | 715/753 |
| 2011/0184778 A1* | 7/2011 | Graepel | G06N 7/005 |
| | | | 705/7.31 |
| 2011/0194629 A1 | 8/2011 | Bekanich | |
| 2011/0231499 A1 | 9/2011 | Stovicek et al. | |
| 2011/0276396 A1* | 11/2011 | Rathod | G06F 17/30867 |
| | | | 705/14.49 |
| 2011/0288962 A1* | 11/2011 | Rankin, Jr. | G06F 17/30525 |
| | | | 705/27.1 |
| 2011/0289106 A1* | 11/2011 | Rankin, Jr. | G06Q 10/10 |
| | | | 707/769 |
| 2011/0289161 A1* | 11/2011 | Rankin, Jr. | G06Q 10/107 |
| | | | 709/206 |
| 2012/0109737 A1* | 5/2012 | Setty | G06Q 30/0242 |
| | | | 705/14.41 |
| 2012/0117156 A1* | 5/2012 | Anka | G06Q 10/101 |
| | | | 709/205 |
| 2012/0151380 A1* | 6/2012 | Bishop | G06Q 10/107 |
| | | | 715/752 |
| 2012/0167162 A1 | 6/2012 | Raleigh et al. | |
| 2012/0278164 A1* | 11/2012 | Spivack et al. | 705/14.52 |
| 2012/0284093 A1 | 11/2012 | Evans | |
| 2013/0022292 A1* | 1/2013 | Miyagi | H04N 1/00145 |
| | | | 382/286 |
| 2013/0024570 A1* | 1/2013 | Mizoguchi | H04L 67/2819 |
| | | | 709/225 |
| 2013/0110941 A1* | 5/2013 | Lewis | G06F 17/30876 |
| | | | 709/206 |
| 2013/0139225 A1* | 5/2013 | Saito | G06F 21/608 |
| | | | 726/4 |
| 2013/0212197 A1 | 8/2013 | Karlson | |
| 2013/0275138 A1 | 10/2013 | Gruber et al. | |
| 2013/0275875 A1 | 10/2013 | Gruber et al. | |
| 2013/0275899 A1 | 10/2013 | Schubert et al. | |
| 2013/0290442 A1* | 10/2013 | Dgani | G06Q 10/107 |
| | | | 709/206 |
| 2013/0311860 A1* | 11/2013 | Kritt | G06F 17/30554 |
| | | | 715/205 |
| 2013/0346172 A1* | 12/2013 | Wu | G06Q 30/0214 |
| | | | 705/14.16 |
| 2014/0009776 A1* | 1/2014 | Suzuki | G06K 15/1807 |
| | | | 358/1.13 |
| 2014/0108506 A1* | 4/2014 | Borzycki | H04L 67/10 |
| | | | 709/203 |
| 2014/0129942 A1* | 5/2014 | Rathod | H04N 21/44222 |
| | | | 715/720 |
| 2014/0164528 A1 | 6/2014 | Kleppmann et al. | |
| 2014/0164529 A1* | 6/2014 | Kleppmann | H04L 29/08072 |
| | | | 709/206 |
| 2014/0195976 A1* | 7/2014 | Ow | G06F 3/04847 |
| | | | 715/833 |
| 2014/0325362 A1* | 10/2014 | Potts | G06F 17/30058 |
| | | | 715/732 |
| 2014/0351030 A1* | 11/2014 | Priebatsch | G06Q 30/0211 |
| | | | 705/14.13 |
| 2015/0135081 A1* | 5/2015 | Lewis | G06F 17/30876 |
| | | | 715/733 |
| 2015/0271118 A1* | 9/2015 | Nudel | H04L 51/08 |
| | | | 709/206 |
| 2015/0350362 A1 | 12/2015 | Pollack et al. | |
| 2015/0370513 A1* | 12/2015 | Mizoguchi | G06F 3/1285 |
| | | | 358/1.15 |
| 2016/0094623 A1* | 3/2016 | Takayama | H04L 67/10 |
| | | | 709/203 |

FOREIGN PATENT DOCUMENTS

| | | |
|---|---|---|
| CN | 101960795 A | 1/2011 |
| CN | 104782094 A | 7/2015 |
| IN | 2657DELNP2015 A | 9/2015 |
| WO | WO-2014089481 A1 | 6/2014 |

OTHER PUBLICATIONS

"U.S. Appl. No. 13/708,518, Response filed Dec. 12, 2014 to Non Final Office Action mailed Sep. 12, 2014", 7 pgs.

"U.S. Appl. No. 13/708,055, Non Final Office Action mailed Sep. 12, 2014", 5 pgs.

"U.S. Appl. No. 13/708,518, Non Final Office Action mailed Sep. 12, 2014", 5 pgs.

"International Application Serial No. PCT/US2013/073660, International Search Report mailed May 15, 2014", 2 pgs.

"International Application Serial No. PCT/US2013/073660, Written Opinion mailed May 15, 2014", 6 pgs.

"U.S. Appl. No. 13/708,055, Non Final Office Action mailed Apr. 10, 2015", 11 pgs.

"U.S. Appl. No. 13/708,518, Non Final Office Action mailed Apr. 13, 2015", 8 pgs.

"U.S. Appl. No. 13/708,055, Non Final Office Action dated Mar. 28, 2016", 13 pgs.

"U.S. Appl. No. 13/708,055, Non Final Office Action dated Oct. 8, 2015", 12 pgs.

"U.S. Appl. No. 13/708,055, Response filed Jun. 12, 2015 to Non Final Office Action dated Apr. 10, 2015", 9 pgs.

"U.S. Appl. No. 13/708,055, Response filed Jul. 28, 2016 to Non Final Office Action dated Mar. 28, 2016", 11 pgs.

"U.S. Appl. No. 13/708,518, Final Office Action dated Oct. 8, 2015", 9 pgs.

"U.S. Appl. No. 13/708,518, Non Final Office Action dated Mar. 17, 2016", 9 pgs.

"U.S. Appl. No. 13/708,518, Response filed Jun. 12, 2015 to Non Final Office Action dated Apr. 13, 2015", 9 pgs.

"U.S. Appl. No. 14/122,970, Non Final Office Action dated Mar. 17, 2016", 11 pgs.

"European Application Serial No. 13861110.8, Extended European Search Report dated Jun. 30, 2016", 7 pgs.

(56) References Cited

OTHER PUBLICATIONS

"International Application Serial No. PCT/US2013/073660, International Preliminary Report on Patentability dated Jun. 18, 2015", 8 pgs.
"U.S. Appl. No. 13/708,055, Advisory Action dated Jan. 25, 2017", 2 pgs.
"U.S. Appl. No. 13/708,055, Final Office Action dated Nov. 3, 2016", 14 pgs.
"U.S. Appl. No. 13/708,055, Notice of Allowance dated Mar. 10, 2017", 16 pgs.
"U.S. Appl. No. 13/708,055, Notice of Allowance dated Mar. 28, 2017", 2 pgs.
"U.S. Appl. No. 13/708,055, Response filed Jan. 3, 2017 to Final Office Action dated Nov. 3, 2016", 10 pgs.
"U.S. Appl. No. 13/708,055, Response filed Feb. 3, 2017 to Advisory Action dated Jan. 25, 2017", 11 pgs.
"U.S. Appl. No. 13/708,055, Response filed Sep. 14, 2016 to Non Final Office Action dated Mar. 28, 2016", 11 pgs.
"U.S. Appl. No. 13/708,518, Advisory Action dated Feb. 10, 2017", 3 pgs.
"U.S. Appl. No. 13/708,518, Final Office Action dated Oct. 7, 2016", 9 pgs.
"U.S. Appl. No. 13/708,518, Non Final Office Action dated Mar. 30, 2017", 9 pgs.
"U.S. Appl. No. 13/708,518, Response filed Jan. 9, 2017 to Final Office Action dated Oct. 7, 2016", 10 pgs.
"U.S. Appl. No. 13/708,518, Response filed Sep. 14, 2016 to Non Final Office Action dated Mar. 17, 2016", 8 pgs.
"European Application Serial No. 13861110.8, Response filed Sep. 9, 2016 to Extended European Search Report dated Jun. 30, 2016", 20 pgs.
"Indian Application Serial No. 2657/DELNP/2015, Voluntary Amendment filed Apr. 15, 2015", 15 pgs.
"European Application Serial No. 17156727.4, Extended European Search Report dated Jul. 11, 2017", 4 pgs.
"Chinese Application Serial No. 2013800585127, Office Action dated Jun. 21, 2017", W/English Translation, 27 pgs.

* cited by examiner

COMMUNICATION SYSTEMS AND METHODS

RELATED APPLICATION

The present application is a Continuation of co-pending U.S. patent application Ser. No. 13/708,055, entitled "Communication Systems and Methods", filed on Dec. 7, 2012, the disclosure of which is incorporated by reference herein in its entirety.

TECHNICAL FIELD

The present disclosure relates to communication systems and methods that provide supplemental information associated with communicated data.

BACKGROUND

Computing systems are capable of communicating various types of messages and information to other devices and systems. In some situations, an identity of a user or system that initiated a particular message is associated with the message. The identity of the user who initiated the particular message is useful to the recipient of the message in determining whether to read the message and in understanding the context of the message. For example, a user may handle a message received from a potential customer differently than a message received from a potential vendor. As users receive an increasing number of messages, efficient handling of these messages may become difficult.

BRIEF DESCRIPTION OF THE DRAWINGS

Some embodiments are illustrated by way of example and not limitation in the figures of the accompanying drawings.

DETAILED DESCRIPTION

Figure 1:
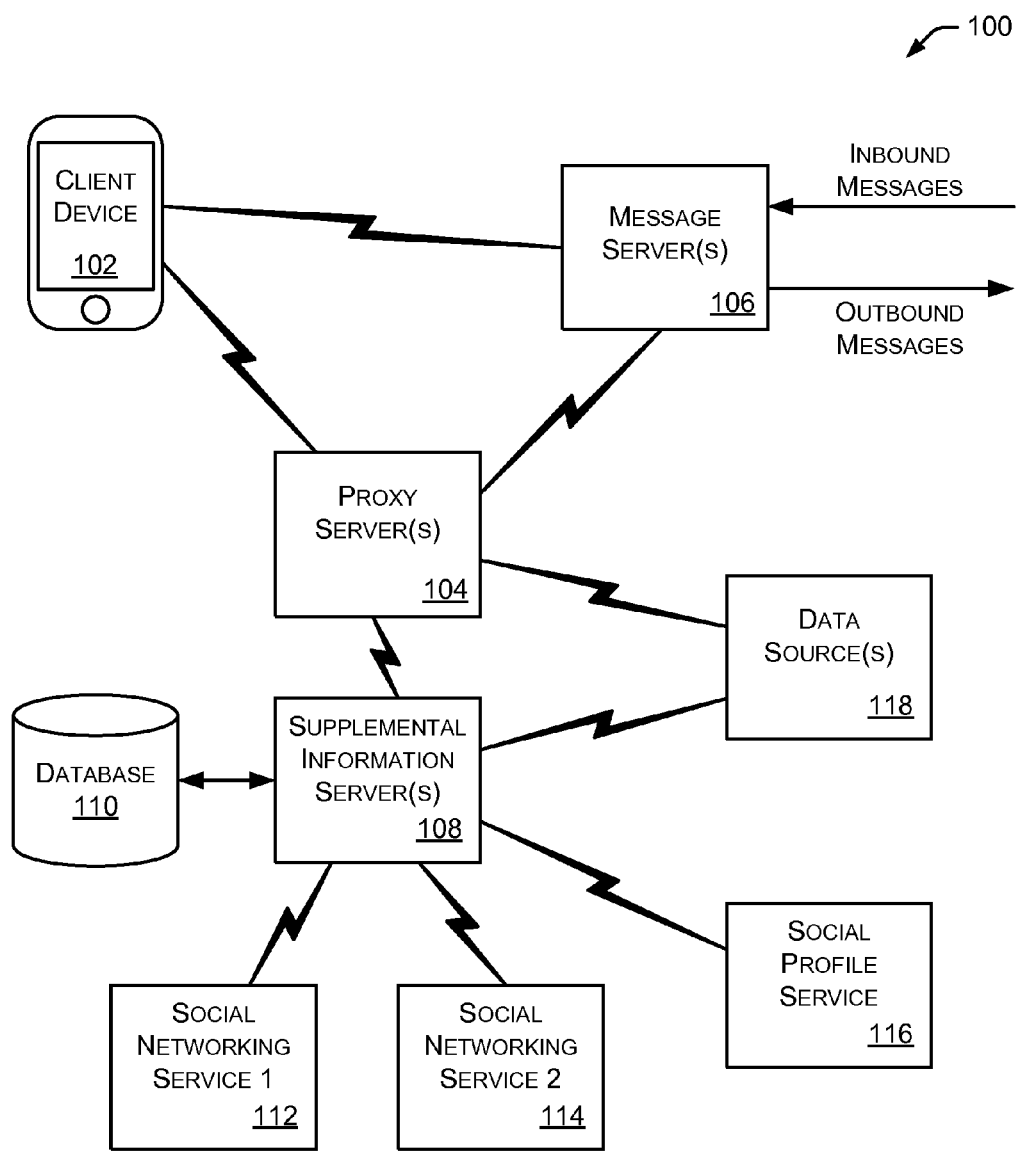
FIG. 1 is a block diagram of an environment within which an example embodiment may be deployed.

Example systems and methods of communicating messages are described. In the following description, for purposes of explanation, numerous specific details are set forth in order to provide a thorough understanding of example embodiments. It will be evident, however, to one skilled in the art that the present invention may be practiced without these specific details.

The systems and methods described herein modify communication channels with additional contextual information. The communication channels include, for example, email communications, text message communications, social networking communications, newsgroup communications, web forum communications, instant messaging communications, and the like. The additional contextual information includes, for example, information associated with a sender of a message (such as name, photo, employer, job title, and hobbies), common friends of a recipient and the sender of the message, information associated with another recipient of the message, a map displaying a geographic location identified in the message, address book information associated with a phone number in the message, address book information associated with an email address in the message, and the like.

In some embodiments, the described systems and methods allow users to see a communication history with other users to refresh their memory regarding previous topics discussed and past actions performed. When receiving a message from an unknown sender, the described systems and methods may display a job title, employer, interests, and other background information associated with the sender. This additional information allows the recipient to better understand the message content and respond appropriately to the message. Additionally, providing a photo of a user assists others in identifying the user at a meeting or other event. When attempting to develop a relationship with another person, a user can gain insight about the other person based on, for example, social media postings and other online communications. This insight may identify topics of mutual interest that provide a starting point for a conversation. Additionally, the described systems and methods allow users to share links and other information with various users through, for example, a social network. Users can also make social network connections with senders or recipients of messages, and perform other activities. Further, the described systems and methods allow users to create a list of links and other information contained in various messages that the user wants to review at a later time.

The systems and methods described herein allow users to continue using their existing communication tools while modifying the functionality of those communication tools. In particular implementations, the additional functionality is provided through a proxy server associated with the communication of messages. The proxy server supports a variety of communication tools and various additional functions associated with those communication tools. The described systems and methods allow users to continue using their existing communication tools without changing to a different tool. Additionally, the additional features are available to users of communication tools that do not directly support third-party extensions.

FIG. 1 is a block diagram of an environment 100 within which an example embodiment may be deployed. A client device 102 communicates with a proxy server 104 and a message server 106. The client device 102 may be any type of device capable of communicating with other servers and systems, such as a cellular phone, a smart phone, a desktop computer, a laptop computer, a tablet computer, a portable entertainment device, a set top box, a game console, and the like. In some embodiments, the client device 102 includes a software application that facilitates the communication of messages to and from other systems and devices. The client device 102 communicates with the proxy server 104 and the message server 106 through one or more data communication networks, such as a local area network (LAN), wide area network (WAN), and the Internet. Although one client device 102 is shown in FIG. 1, a typical environment 100 may include any number of client devices 102 coupled to any number of proxy servers 104 and any number of message servers 106.

The message server 106 receives inbound messages and sends outbound messages to various other systems. In particular embodiments discussed herein, the message server 106 communicates email messages. However, alternate embodiments of the message server 106 may communicate any type of message or other information. In some embodiments, the message server 106 includes multiple servers coupled to a load balancer, which distributes message-related tasks to the multiple servers.

The proxy server 104 receives inbound messages from the message server 106 and communicates outbound messages to the message server 106 for processing. From a user's perspective, the proxy server 104 provides services that are similar to, and compatible with, the message server 106. A user who wishes to enhance their communications can change the configuration of the client device 102 to access the proxy server 104 instead of the message server 106. The proxy server 104 communicates with a supplemental information server 108 and one or more data sources 118, which provide, for example, additional information related to a message, a message sender, a message recipient or a message's content. The proxy server 104 receives message requests, message content, user credentials, and other information from the client device 102 and communicates an appropriate outbound message request to the message server 106. Additionally, the proxy server 104 receives inbound messages from the message server 106 and enhances the received inbound messages with supplemental information.

As discussed herein, the proxy server 104 accepts connection requests from client device 102 and, in turn, the proxy server 104 connects to the message server 106 as though it were a client. In this example, the message server 106 may be referred to as an "upstream server" (i.e., the server that contains the actual message store). In this situation, the proxy server 104 appears as a client to the message server 106. Data sent from the client device 102 to the proxy server 104 is forwarded to the message server 106, and data sent from the message server 106 to the proxy server 104 is forwarded to the client device 102. As discussed herein, data may be processed, stored, analyzed, and modified as it passes through the proxy server 104.

In some embodiments, after the client device 102 has authenticated itself, the proxy server 104 can associate the data with other information associated with the same user. This allows the proxy server 104 to customize any modifications of the data to the particular user whose data is being processed. Additionally, the client device 102 can be configured to report information about itself (e.g., hardware device type, software version, and screen size) to the proxy server 104. The proxy server 104 can then customize any modifications to the data based on the characteristics and capabilities of the client device 102. For example, the proxy server 104 can add minimal data when the client device 102 is a mobile device with a small screen, add more data when the client device 102 is a tablet computer, and add the most data when the client device 102 is a laptop or desktop computer. The same user can use the same proxy server 104 with the same credentials on different client devices 102 and have a different experience on each client device 102, customized to the client device's capabilities and usage.

In particular embodiments, the proxy server 104 communicates email messages. However, alternate embodiments of the proxy server 104 may communicate any type of message or other information. In some embodiments, the proxy server 104 includes multiple servers coupled to a load balancer, which distributes message-related tasks to the multiple servers. Additional details regarding the operation of the proxy server 104 are discussed herein.

The supplemental information server 108 receives information from any number of sources, such as a database 110, a first social networking service 112, a second social networking service 114, and a social profile service 116. The social networking services 112 and 114 include any type of social network or other social community in which users share information about themselves, comments, preferences, hobbies, photos, videos, and other information. The social profile service 116 allows users to store or share user profile information, such as name, contact information, career, hobbies, activities, events, and the like.

Figure 2:
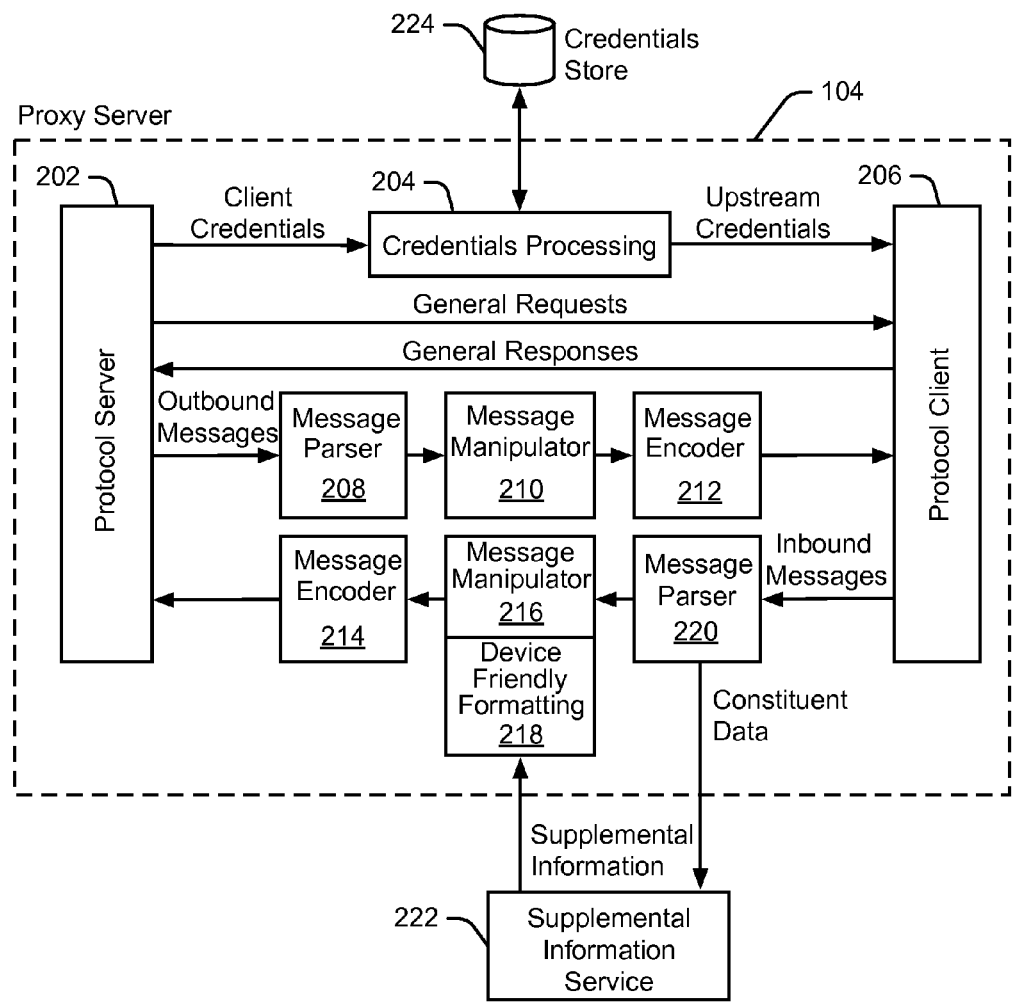
FIG. 2 is a block diagram of a proxy server, in accordance with some embodiments of the present invention.

FIG. 2 is a block diagram of proxy server 104, in accordance with some embodiments of the present invention. The proxy server 104 accepts inbound connections from client devices in a supported protocol, such as IMAP (Internet Message Access Protocol). For each inbound connection, the proxy server 104 uses a client component 206 to establish a connection to the appropriate upstream server (an instance of the message server 106). Requests and data from the client device are forwarded to the upstream server. Similarly, requests and data from the upstream server are forwarded to the client device. Special handling procedures are inserted for commands that handle credentials, and for protocol data that contains messages. Messages are passed through a pipeline in which they are parsed, analyzed, manipulated, and re-encoded before they are forwarded to the other system. The analysis and manipulation of messages may make use of one or more supplemental information services.

In the example of FIG. 2, an incoming connection from a client device 102 is handled by a protocol server 202. On receiving authentication credentials from the client device 102, the protocol server 202 provides client credentials to a credentials processing module 204, which may store various information in a credentials store 224 or retrieve various information from the credentials store 224. The credentials processing module 204 communicates upstream credentials to a protocol client 206, which connects to a message server 106. General requests and general responses are communicated between the protocol server 202 and the protocol client 206. Outbound messages are communicated from the protocol server 202 to a message parser 208, which parses each of the outbound messages. A message manipulator 210 manipulates outbound messages and a message encoder 212 re-encodes outbound messages in a standard message format. The message encoder 212 communicates the encoded outbound message to the protocol client 206.

Inbound messages are communicated from the protocol client 206 to a message parser 220, a message manipulator 216, and a message encoder 214. The message encoder 214 communicates the encoded inbound message to the protocol server 202. A device friendly formatting module 218 interacts with the message manipulator 216 to properly format inbound messages for the device that will be receiving and displaying the inbound message. The message parser 220 and the device friendly formatting module 218 also communicate with a supplemental information service 222, which provides various supplemental information that may be added to particular inbound messages. In some embodiments, the message parser 220 provides constituent data (e.g., any type of information associated with a sender of the inbound message) to the supplemental information service 222, which uses the constituent data to identify appropriate supplemental information. The constituent data includes, for example, an identity of a sender of the message, an identity of at least one other recipient of the message, a geographic location or postal address, a phone number, an email address, an activity request, a URL (uniform resource locator), a name of a person, a name of a company, a language of the message, a unique message identifier, an indicator of importance or urgency or an indicator of an unwanted message.

Figure 3:
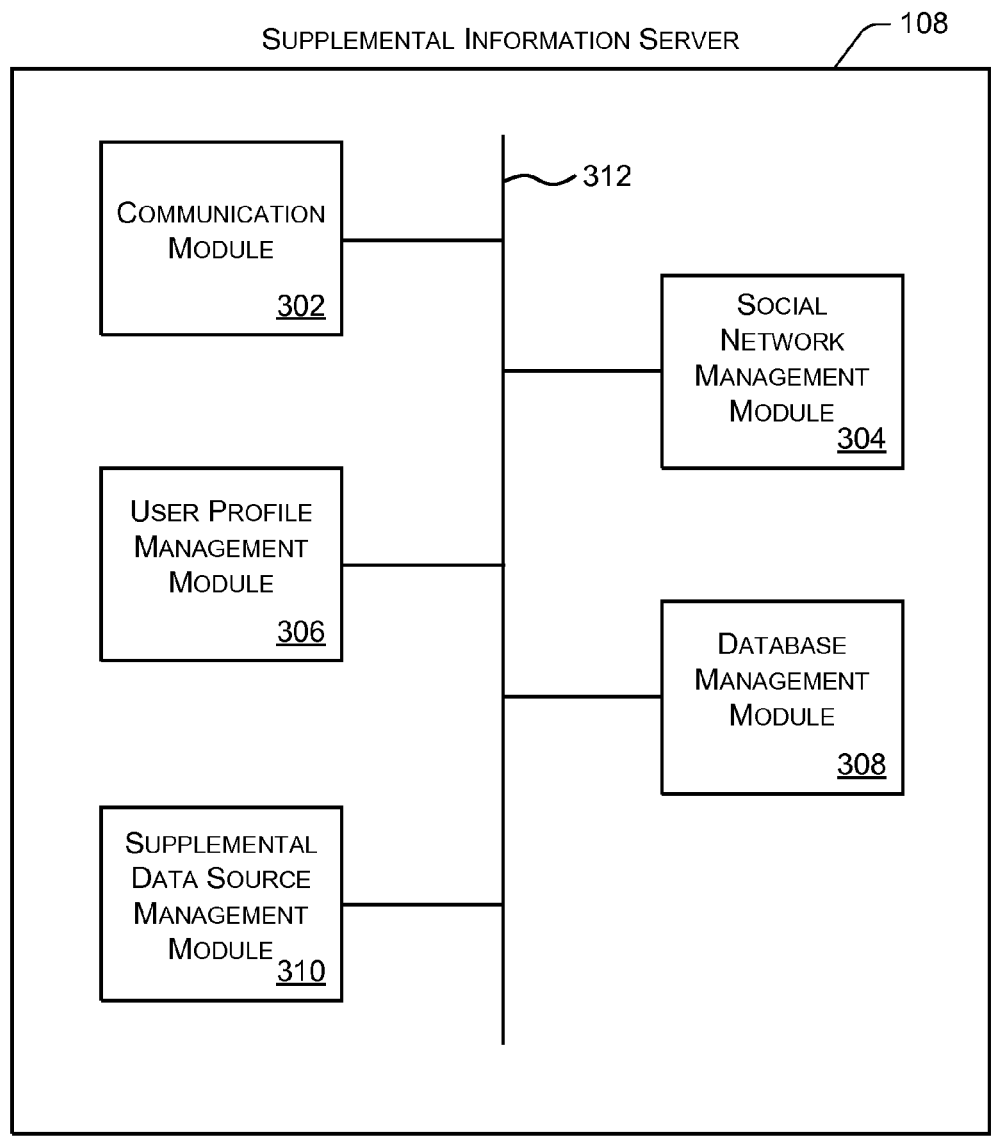
FIG. 3 is a block diagram of a supplemental information server, in accordance with some embodiments of the present invention.

FIG. 3 is a block diagram of the supplemental information server 108, in accordance with some embodiments of the present invention. In various embodiments, the supplemental information server 108 implements computer programs, logic, applications, methods, processes, or software for managing supplemental information as described herein. The supplemental information server 108 includes a communication module 302, a social network management module 304, a user profile management module 306, a database management module 308, and a supplemental data source management module 310, coupled to one another via a data communication bus 312. The communication module 302 allows the supplemental information server 108 to communicate with other components and systems (e.g., the proxy server 104, the data source 118, the social profile service 116, the social networking services 112 and 114, and the like).

The social network management module 304 manages various interaction with, for example, the social networking services 112 and 114, such as the retrieval of data from the social networking services 112 and 114 as well as the storage of data to the social networking services 112 and 114. The user profile management module 306 manages interaction with, for example, the social profile service 116, such as the retrieval of data from and the storage of data to the social profile service 116. The database management module 308 manages various data storage functions associated with one or more data storage devices, such as the database 110. The supplemental data source management module 310 manages interaction with, for example, the data source 118 and other sources of supplemental information. In some embodiments, the supplemental data source management module 310 retrieves data from the data source 118 for use by the supplemental information server 108. The data communication bus 312 allows the various systems and components of the supplemental information server 108 to communicate with one another.

Figure 4:
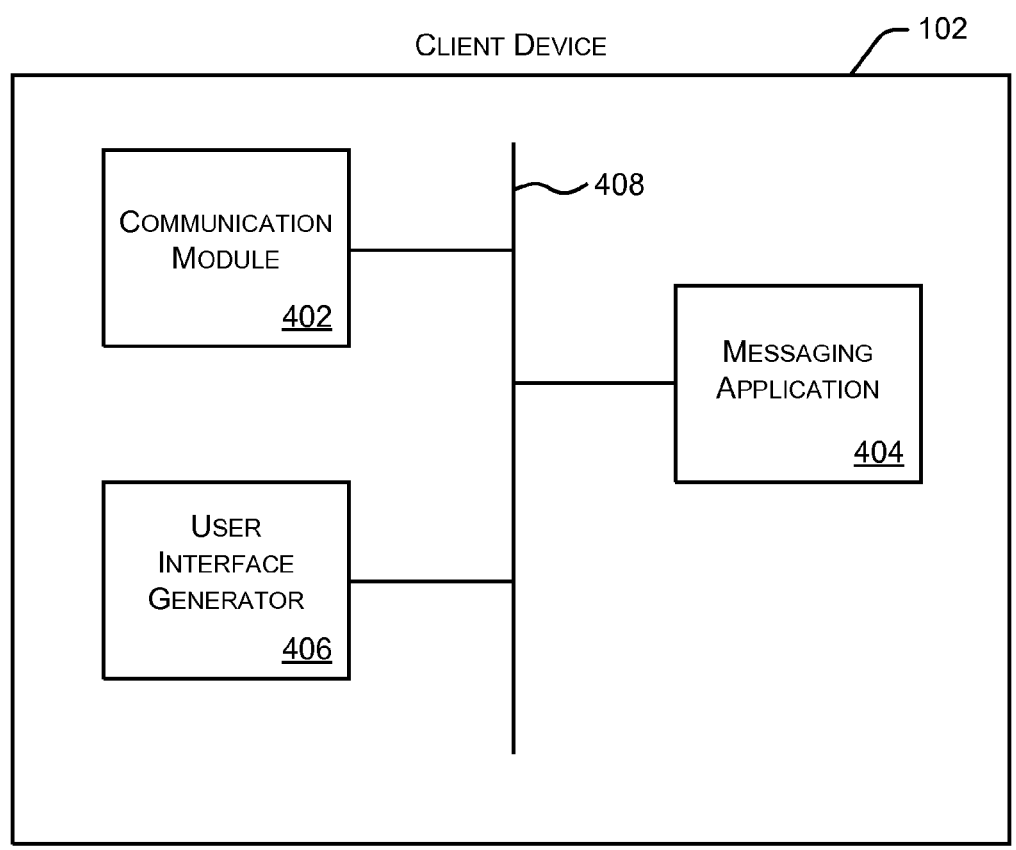
FIG. 4 is a block diagram of a client device, in accordance with some embodiments of the present invention.

FIG. 4 is a block diagram of the client device 102, in accordance with some embodiments of the present invention. In various embodiments, the client device 102 implements computer programs, logic, applications, methods, processes, or software to perform various functions, as described herein. The client device 102 includes a communication module 402, a messaging application 404, and a user interface generator 406, coupled to one another via a data communication bus 408. The communication module 402 allows the client device 102 to communicate with other components and systems (e.g., the proxy server 104, the message server 106, and the like).

The messaging application 404 supports various message-related functions, such as the generation of messages, the display of messages, the sending of messages, and the receipt of messages. The user interface generator 406 creates data to present various user interfaces to a user of the client device 102, such as message display interfaces, user profile interfaces, message sharing interfaces, and the like. The data communication bus 408 allows the various systems and components of the client device 102 to communicate with one another.

Figure 5A:
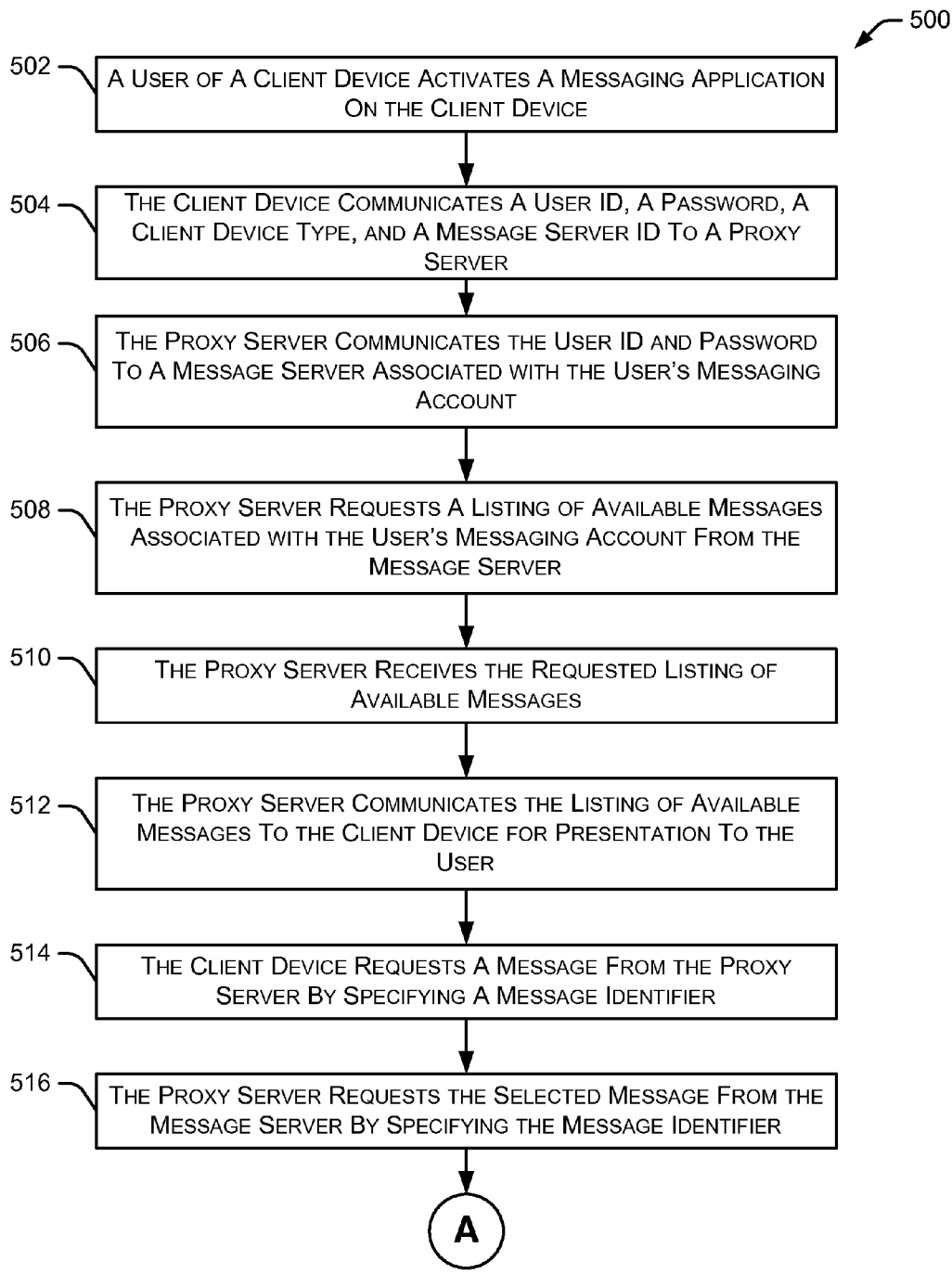
FIGS. 5A and 5B illustrate a flow diagram of a method, in accordance with an embodiment, of handling inbound messages.
Figure 5B:
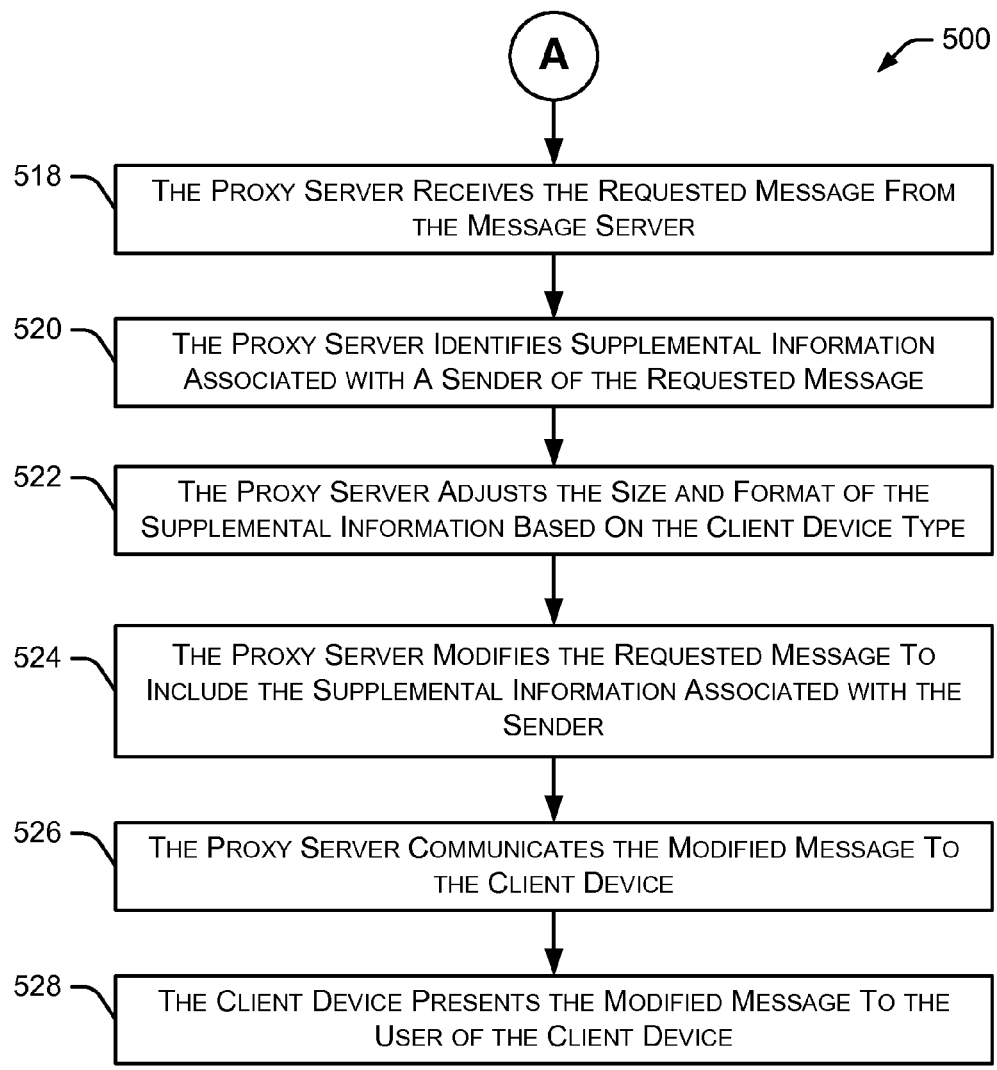

FIGS. 5A and 5B illustrate a flow diagram of a method 500, in accordance with an embodiment, of handling inbound messages. Initially, a user of a client device activates a messaging application on the client device at 502. A messaging application includes any application that is capable of receiving, creating, editing or otherwise handling any type of message. The message may be of any format and contain any type of data. Example messages include an email message, a social media message, a newsgroup message, a calendar synchronization message, a voicemail message, a text message, an address book entry, an audio message, and a video message.

In some embodiments, the client device communicates a user ID, a password, a client device type, and a message server ID to a proxy server at 504. For example, the user ID and other information communicated to the proxy server is associated with a messaging account (e.g., an email account) of the user. The proxy server communicates the user ID and password to a message server associated with the user's messaging account at 506. The message server is identified, for example, based on the message server ID communicated to the proxy server from the client device.

In some embodiments, the proxy server requests a listing of available messages associated with the user's messaging account from the message server at 508. In other embodiments, the proxy server may request a particular message (e.g., a specific message identified by the user of the client device) from the message server. The proxy server receives the requested listing of available messages at 510 and communicates the listing to the client device for presentation to the user at 512. The client device requests (in response to user input) a message from the proxy server by specifying a message identifier at 514 associated with a desired message. The proxy server requests the selected message from the message server by specifying the message identifier at 516.

The proxy server receives the requested message from the message server at 518. The proxy server then identifies supplemental information associated with a sender of the requested message at 520. The supplemental information includes, for example:

information associated with a sender of the message,
  information associated with another recipient of the message,
  a map displaying a geographic location identified in the message, information related to an email address, phone number, URL, name or other identifier contained in the message, where that information is obtained from an address book, a customer relationship management (CRM) system, a vendor relationship management (VRM) system, an applicant tracking system (ATS), an order fulfillment system, a customer support system, an enterprise resource planning (ERP) system, a notetaking system, a task management system or any other privately or publicly accessible database, an option to add an activity request to a reminder list associated with the user of the client device, an option to share a URL contained in the message on at least one social network, an option to translate the message into another language, common connections (e.g., friends or social connections) of the user of the client device and the sender of the message, an indicator of an importance or urgency of the message, a time zone of a geographic location identified in the message, a time zone of a geographic location associated with the sender of the message, a history of previous communications with the sender of the message using the same communication medium, and a history of previous communications with the sender of the message using another communication medium.

Based on the known client device type, the proxy server adjusts the size and format of the supplemental information based on the client device type at 522. For example, the proxy server may make adjustments based on a display size of the client device, computing resources of the client device, a storage capacity of the client device, display resolutions supported by the client device, and the like. These adjustments may make use of a database of devices which stores, for example, the display resolution and software capabilities for a known set of device models. Additionally, the proxy server may adjust a font size, font type, font color or other formatting characteristics of the message and/or the supplemental information. The proxy server then modifies the requested message to include the supplemental information associated with the sender at 524. After modifying the requested message, the proxy server communicates the modified message to the client device at 526. The client device presents the modified message to the user of the client device at 528.

The example of FIGS. 5A and 5B identifies supplemental information based on the sender of the requested message. In alternate embodiments, the supplemental information can be identified based on any type of data contained in or associated with the requested message. For example, the supplemental information can be associated with an identity of at least one other recipient of the message, a geographic location or postal address of the sender of the message, a phone number associated with the sender of the message, an email address associated with the sender of the message, an activity request associated with the message, a URL (uniform resource locator) contained in the message, a language associated with the message, an indicator associated with the importance or urgency of the message, and an indicator identifying the message as an unwanted message. On other embodiments, the supplemental information is identified based on any two or more of the above-identified data examples.

Figure 6:
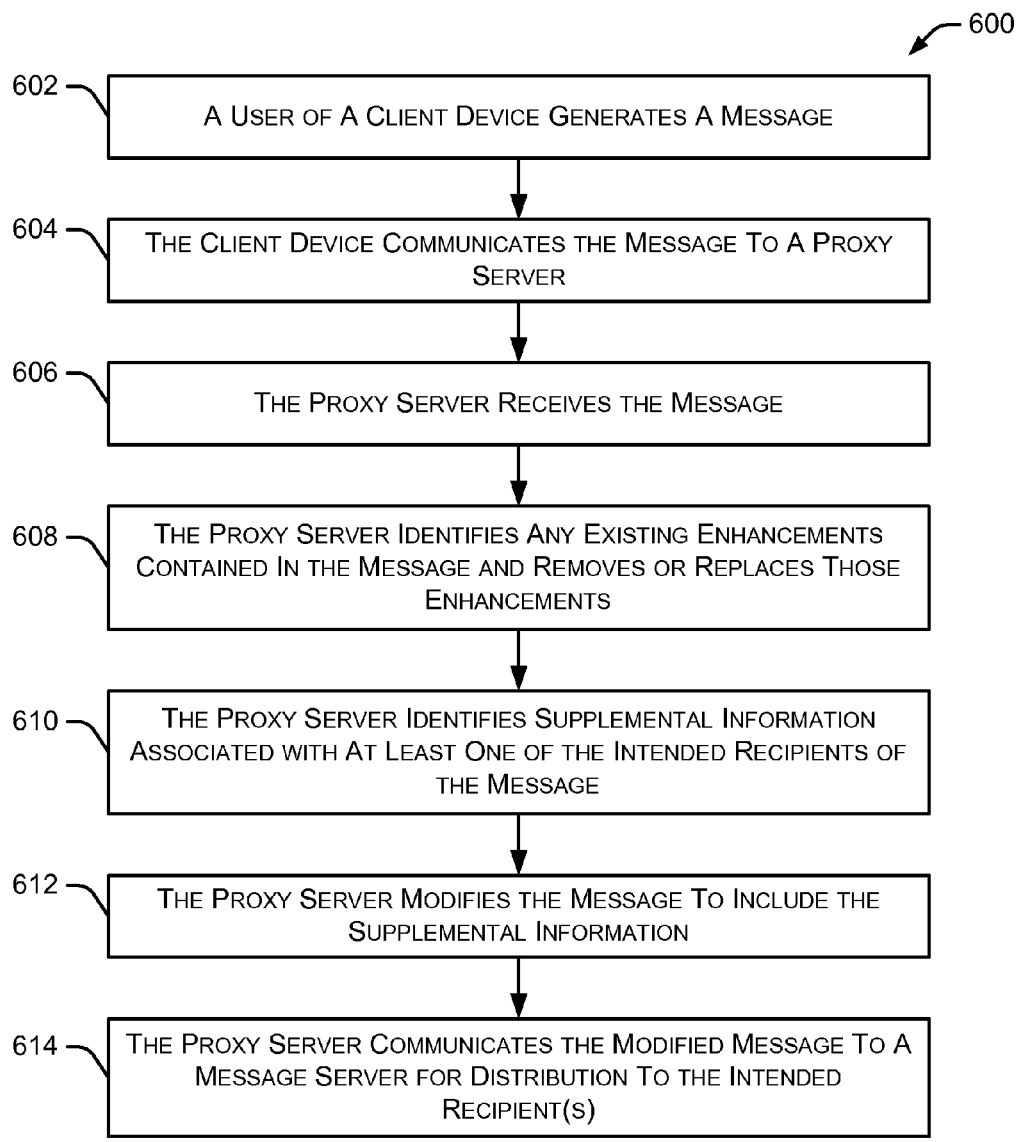
FIG. 6 is a flow diagram of a method, in accordance with an embodiment, of handling outbound messages.

FIG. 6 is a flow diagram of a method 600, in accordance with an embodiment, of handling outbound messages. Initially, a user of a client device generates a message at 602, for example by replying to an existing message, by forwarding an existing message, or by starting a new conversation thread. The client device communicates the message to a proxy server at 604. The proxy server receives the message at 606. If the message was generated by reply or forwarding of an existing message, and that existing message was previously modified by a proxy server 104 to contain supplemental information, then the client device 102 may embed that supplemental information in the outbound message, for example in the form of a quotation. At 608, the proxy server may search the message for any such existing supplemental information, and remove, replace or rewrite it as appropriate. The proxy server may also identify supplemental information associated with the sender or at least one of the intended recipients of the message at 610. As discussed above with respect to FIGS. 5A and 5B, alternate embodiments may identify supplemental information associated with any type of data contained in (or associated with) the message. The method 600 continues as the proxy server modifies the message to include the supplemental information at 612. The proxy server then communicates the modified message to a message server for distribution to the intended recipient at 614. As discussed herein, the supplemental information may include any type of information, such as the examples provided herein with respect to FIGS. 5A and 5B.

The proxy server 104 discussed herein may include multiple different types of servers, such as an IMAP (Internet Message Access Protocol) proxy server, an Exchange ActiveSync proxy server, and an SMTP (Simple Mail Transfer Protocol) proxy server. In some embodiments, a single proxy server handles both inbound messages and outbound messages. In other embodiments, inbound messages are handled by one proxy server and outbound messages are handled by a different proxy server, such as an IMAP proxy server for inbound messages and an SMTP proxy server for outbound messages. The following discussion provides example embodiments of various types of proxy servers.

IMAP Proxy Server

To the client device 102, the proxy server 104 presents itself as a standards-compliant IMAP server. To upstream servers (e.g., the message server 106), the proxy server 104 presents itself as a standards-compliant IMAP client. In some embodiments, the proxy server 104 supports authentication with username and password as the authentication mechanism. The proxy server 104 does not need to maintain its own user database, since it can delegate authentication to the message server 106. If a client issues a CAPABILITY command before the proxy server 104 is connected to the message server 106, the proxy server 104 will report its own capabilities.

Since different users may use different message servers 106 with the same proxy server 104, the name or address of the message server 106 is encoded in the credentials sent by the client device 102. This technique is also used to encode properties of the client device 102. For example, if the client device 102 is an Apple iPad® tablet running iOS version 5.1, and the client wants to access user "martin@rapportive.com" on the message server "imap.gmail.com", then the client device 102 could combine all of this information into the IMAP LOGIN username, such as "d=ipad:v=5.1:s=imap.gmail.com: u=martin@rapportive.com". The proxy server 104 parses that username string, and uses "martin@rapportive.com" as the username when connecting to the message server "imap.gmail.com". Alternatively, an opaque unique identifier can be used as username, if the proxy server 104 maintains a mapping from those identifiers to the message server 106 account details. Other fields may be added to the username string. If any of the fields are not to be modified by users, a HMAC (hash-based message authentication code) or other authentication code may be used to prevent users from tampering with the username string.

In some embodiments, it is advisable to include information about the connection and the message server 106 into the username string, and leave the password string unchanged. In some situations, users often change their password, but very rarely change their username. In these situations, if the message server 106 rejects the login, the proxy server 104 can forward the rejection to the client device 102, and the client device 102 can prompt the user for their new password without changing the username. When the client device 102 retries with the same username and the new password, the proxy server 104 can forward the new password to the message server 106 without requiring any special handling.

Figure 8:
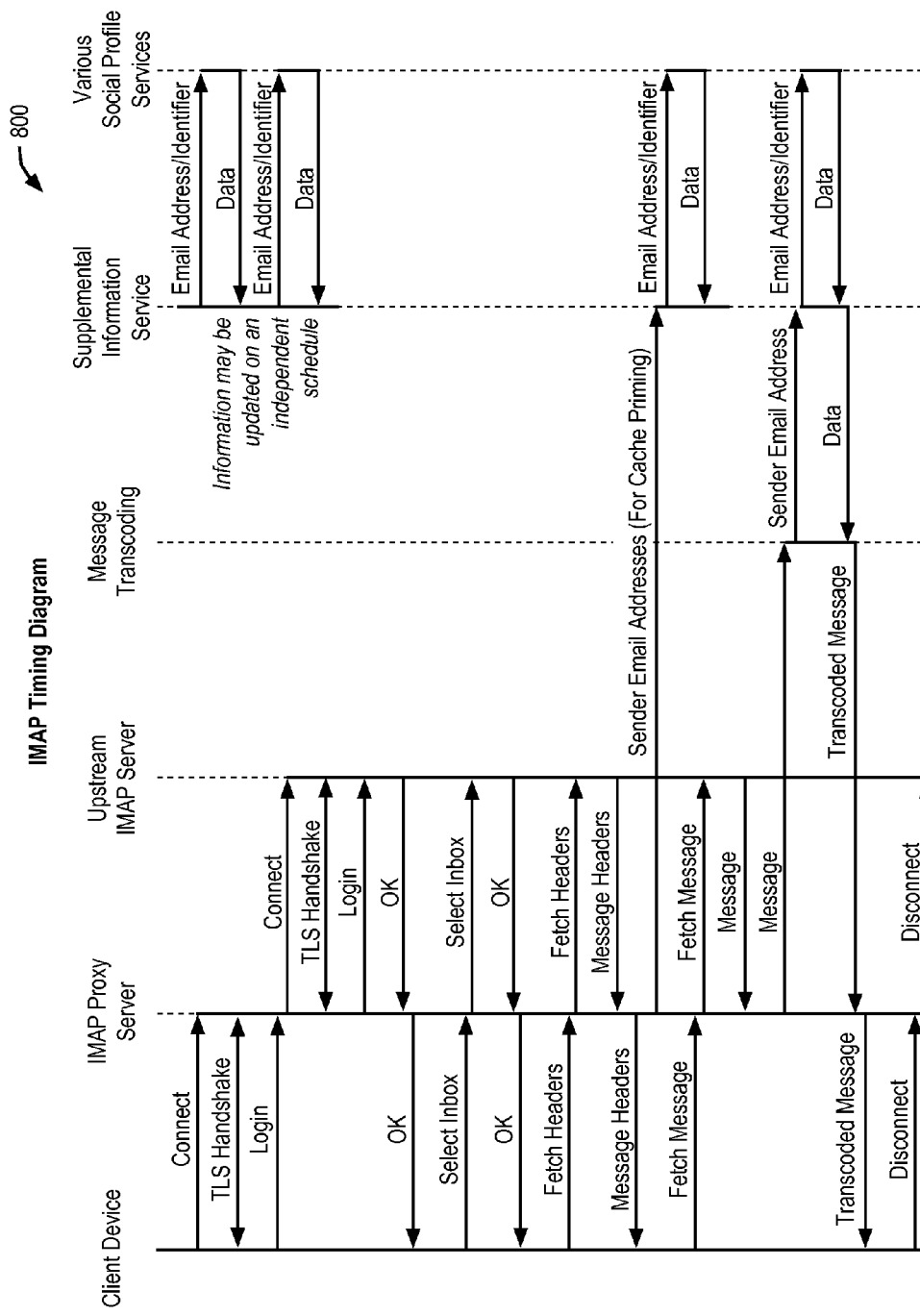
FIG. 8 depicts, in accordance with an embodiment, a diagram illustrating a sequence and timing of events as they may occur in an IMAP proxy configuration.

FIG. 8 depicts, in accordance with an embodiment, a diagram 800 illustrating a sequence and timing of events as they may occur in an IMAP proxy configuration. After establishing a connection to the IMAP proxy server, the client device typically performs a TLS (Transport Layer Security) handshake to establish a secure channel before attempting login. When the IMAP proxy server receives the credentials, it extracts the upstream server hostname from the username field, connects to the upstream server, establishes a secure channel using TLS, and attempts login using the upstream username and password. The success or failure of the upstream login attempt can then be passed on to the client device.

Once the client device 102 is authenticated, the proxy server 104 can safely pass through most commands received from the client device 102, and corresponding responses from the message server 106, without modification. In FIG. 8 this is illustrated with the "Select Inbox" command. Further processing is performed for FETCH, UID FETCH or APPEND (and possibly other) commands received from the client device 102, and the corresponding responses from the message server 106, described as follows.

FETCH commands are used by the client device 102 for various purposes, such as downloading a summary of all messages in a mailbox, downloading the full text of a selected message or downloading message attachments. FIG. 8 illustrates two uses of FETCH, whereby the client first downloads headers of all messages in the inbox, and then downloads the full body of selected messages. In some embodiments, information contained in the message headers may be used to "prime" or "pre-warm" a cache of supplemental information, so that a subsequent FETCH request for the full body may be processed faster. For example, if the sender's email address is being used to search for supplemental information, the email addresses can be extracted from the message headers. This priming operation may occur asynchronously: at the same time as the message headers are returned to the client device, the supplemental information service may begin to process the email addresses.

When a FETCH command for a message body (or part of a message body) is sent by the client device, as illustrated by "Fetch Message" in FIG. 8, the proxy server first fetches that message or message part from the upstream server. It then passes the message to a transcoding process, which may call upon a supplemental information service, which may in turn make use of any number of social profile services. Requests to those social profile services may be made synchronously during transcoding, or may be made on an independent schedule and cached. The transcoded message is then returned to the client.

The FETCH command allows clients to request specific parts ("data items") of a message, such as one particular MIME part, without any headers. The data items requested by a particular FETCH command from the client device 102 may not contain all of the information required by the proxy server 104 to perform the required message rewriting function. For example, if the sender email address is required, the proxy server 104 requires the BODY[HEADER.FIELDS (FROM)] data item, and in order to correctly transform MIME structures, it requires the BODYSTRUCTURE data item if the other data items in the request are for specific MIME parts rather than the entire body. If the FETCH request is for an attachment, and the application does not call for rewriting of attachments, then no additional data items may be required.

The data items not requested by the client device 102 for a particular message, but required by the proxy server 104 for correct rewriting, may be obtained in various ways. One option is for the proxy server 104 to maintain its own persistent store for this message metadata by sequence number or UID by appropriately keeping track of changes in sequence numbering and UIDVALIDITY. If a persistent store is not desired, the proxy server 104 may insert additional requested data items into FETCH requests received from the client device 102 as they are forwarded to the message server 106, so that the corresponding response from the message server 106 contains all of the data items required for correct rewriting of the messages. Any data items added to a FETCH request are removed from the corresponding response by the proxy server 104 before it is forwarded to the client device 102, to maintain protocol correctness.

Certain existing implementations of the message server 106 may have bugs, with the effect that even if a client requests an additional header field, such as the BODY [HEADER.FIELDS (FROM)] data item, it is not returned by the message server 106. The IMAP proxy server 104 may work around such bugs by performing an additional FETCH request to the message server 106, using the same sequence set, requesting only such header fields. In these embodiments of the proxy server 104 that issue additional commands, a lock is taken to prevent the client device 102 from concurrently issuing commands that alter the overall state of the IMAP connection, such as SELECT, until the additional command and response cycle have completed.

The message server 106's response to a FETCH request is processed by the proxy server 104 as follows. Any BODY[ ] data item in the response is processed as described in the section on message rewriting below. Any BODYSTRUCTURE data item in the response is modified in a manner that is consistent with the message rewriting rules, in particular, any change of character encoding or content type of any MIME part (such as the replacement of a text/plain part by a text/html part) is also reflected here. Any BODY[HEADER] data item in the response, containing a Content-Type header, is similarly modified in a manner that is consistent with the message rewriting rules. Any RFC822.SIZE data item in the response may be updated to reflect the size of the message after rewriting has occurred. Other data items that were originally requested by the client device 102 may be passed through without modification.

If an application needs a strict one-to-one correspondence between the set of messages reported by the message server 106 and the set of messages reported by the proxy server 104 to the client device 102, then any message sequence numbers and UIDs may be passed between the message server 106 and the client device 102 without modification. However, if an application requires that the set of messages seen by the client device 102 be modified (for example, that messages of low importance should be hidden when reading the contents of a particular mailbox, or for introducing virtual mailboxes as described below), then the proxy server 104 maintains a mapping between the client device 102 and the message server 106's respective views of sequence numbers and UIDs. Additionally, the proxy server 104 translates them in both directions in all commands and responses. Sequence numbers obey IMAP's contract of not exhibiting gaps in the sequence, but since the mapping is local to a session, it does not require persistent storage. With UIDs, gaps are allowed. Thus, as long as messages are hidden and not added by the proxy server 104, the proxy server 104 can use the same UID values for communicating with the client device 102 as it uses for communicating with the message server 106. If the application needs the client device 102 to be presented with messages that do not exist on the message server 106 (such as system notifications that apply to this particular client device 102), then, to comply with IMAP protocol requirements, the proxy server 104 persistently stores, for each message, the UID presented by the message server 106 and the UID presented to the client device 102 (which may be different, and either UID may be absent if the message was inserted or hidden by the proxy server 104).

If an application wishes to introduce virtual mailboxes (i.e., mailboxes that are visible to the client device 102 but do not exist on the message server 106, and whose contents are determined by the results of a search query or some other processing), or to rename mailboxes (e.g., to ensure that sent messages are placed in the designated sent items folder on the message server 106), then the proxy server 104 also intercepts the LIST, SELECT, EXAMINE, STATUS, CREATE, DELETE, RENAME, SUBSCRIBE, UNSUBSCRIBE, and LSUB commands and their associated responses. The virtual or renamed mailbox name is inserted into responses containing lists of mailbox names, and requests including a virtual mailbox name are not forwarded to the message server 106, or renamed in reverse before forwarding to the message server 106. In a virtual mailbox scenario, the application will need to determine appropriate semantics for the COPY command and propagation of message flags (e.g., \Seen and \Deleted).

APPEND commands most commonly appear in conjunction with sending a message via SMTP, which occurs on a separate connection. The IMAP APPEND command is used to save a message to the user's "sent mail" folder. Users expect the messages in their "sent mail" folder to be the identical to the messages received by their respective recipients (modulo headers added in MTA (Message Transfer Agent) transit), so the message that appears with APPEND is modified by the IMAP proxy server in the same way as the same message is modified by the SMTP proxy, discussed below.

Exchange ActiveSync Proxy Server

In Exchange ActiveSync, the user is authenticated with a username and a password, encoded using the HTTP Basic authentication scheme. The Authorization header is typically included on all POST requests made by the client, and the Exchange ActiveSync proxy server can simply pass this header through to the message server 106. Exchange ActiveSync also uses HTTP OPTIONS requests, which typically do not include an Authorization header. However, OPTIONS requests are still forwarded by the Exchange ActiveSync proxy server to the message server 106, in order to detect the Exchange server version and other information. It is therefore not sufficient to encode the message server 106 name in the username, like described in the case of the IMAP proxy server, because the Exchange ActiveSync proxy server would not know which message server 106 to use for an OPTIONS request. Instead, the described systems and methods use the fact that HTTP includes the full hostname in a Host header. Combined with a wildcard DNS record, it is possible to encode arbitrary information in a subdomain name. For example, if the message server 106 is "exchange01.upstream.com", first, to escape the periods, replace "." by "0–" and "0" by "00". If the DNS for "*.activesync.example.com" resolves to the IP address of the Exchange ActiveSync proxy, the client device 102 can now be configured to connect to "exchange0010-upstream-0com.activesync.example.com". The escaping of periods is necessary because although the DNS wildcard covers multiple levels of subdomains, wildcard SSL certificates cover a single level of subdomain. By encoding the full upstream server name in just one level of subdomain, a wildcard SSL certificate for "*.activesync.example.com" is accepted as valid by clients.

When the client device 102 makes a request to the Exchange ActiveSync server, the request cannot be blindly forward it to the message server 106 because each request includes a "DeviceId" parameter, and the message server 106 maintains synchronization state information for each combination of username and DeviceId. Unfortunately, it is possible for a user to have two email accounts for the same user configured on the same client device 102, one using the proxy server and one connecting directly to the message server 106. If this happens, the client device 102 considers the two connections to the two servers (i.e., the Exchange ActiveSync proxy server and the message server 106) to have different synchronization states from each other, but the message server 106 sees identical DeviceIds and therefore applies the same synchronization state to both connections. This leads to undefined results. To solve this problem, the Exchange ActiveSync proxy server modifies the DeviceId on client device 102 requests to be some other string, not equal to any other client device 102 used by the same user. Typically, appending an arbitrary suffix to the DeviceId is sufficient.

Thus, on each request sent from the client device 102 to the Exchange ActiveSync proxy server, the DeviceId parameter is replaced, and the Host header is replaced to refer to the message server's hostname. If the response from the message server 106 contains any Set-Cookie headers that include the message server's hostname, the Exchange ActiveSync proxy server rewrites them to use the Exchange ActiveSync proxy server's encoded subdomain in the cookie's domain field. The HTTP request and response bodies can safely be passed by the Exchange ActiveSync proxy server, except on the Sync, SendMail, SmartForward, and SmartReply commands, as described below.

Sync commands from the client device 102 are not modified by the Exchange ActiveSync proxy server, but the client's WBXML (Wireless application protocol Binary XML) request body is parsed to determine the type of sync. For example, AirSync:GetChanges with a value of 0 may be used by the client device 102 to indicate the download of a particular message, rather than a sync of folder contents, and the AirSyncBase:BodyPreference element may be sent by client devices to indicate the requested message format (plain text, HTML, RTF or MIME) and truncation of message contents. This information is used in message transcoding, to ensure the message is given to the client device 102 in the format expected by the client device 102.

The WBXML in the Sync command response from the message server 106 needs to be decoded and searched for any AirSync:Fetch elements that are children of an AirSync: Responses element, and any AirSync:Add or AirSync: Change elements that are children of a AirSync:Commands element. Such elements may contain an email message or another type of message (e.g., a meeting invitation). Email messages can be detected by examining whether the AirSync:ApplicationData/Email:MessageClass value is "IPM.Note". An application that wishes to only process email messages can pass through messages with other MessageClass values without modification, but other applications may want to also enhance calendar entries and other types of messages.

For email messages that are to be parsed and modified, the content type (AirSyncBase:Type) is inspected, which may be plain text, HTML, RTF or MIME. In the case of plain text or HTML, the code page value in the Email:InternetCPID element is used to determine the message's character encoding, and if character encoding normalization is applied, this element is updated with the code page ID of the normalized encoding. Together with this content type information, the message data (AirSyncBase:Data element) can be passed to the message transcoding and enhancement layers, discussed below. The content type of the message cannot safely be modified as the returned message format needs to match the format request by the client device 102, but the message data can be replaced with the enhanced version before reassembling the WBXML response and sending it to the client device 102.

When sending a message, the client device 102 uses the SendMail, SmartReply or SmartForward command. Typically, the outbound message is contained in the client device's request body in a ComposeMail:MIME element. This message is used both for transmission to the message's recipients and for saving to the user's "sent mail" folder. The Exchange ActiveSync proxy server modifies this message in the same way as the SMTP proxy server, discussed herein, and the modified SendMail, SmartReply or SmartForward request is sent to the message server 106.

SMTP Proxy Server

SMTP is intended to allow intermediary servers in the transmission of messages, and the use of SMTP intermediary or SMTP proxy servers (e.g., for archival purposes) is common. The approach described herein differs from common SMTP intermediaries in that the SMTP proxy server acts as a Mail Submission Agent for the client device 102, and typically uses another Mail Submission Agent as the message server 106. In this configuration, the recipients' Mail Transfer Agents see messages as coming from the user's normal message server 106, which reduces the risk that they will be marked as spam.

Mail Submission Agents like the message server 106 typically require the user to authenticate with username and password before allowing messages to be submitted. This means that when configuring the client device 102 to connect to the SMTP proxy server, the message server's hostname can be encoded in the username, in the same manner as described for the IMAP proxy server above. When connecting to the message server 106, the SMTP proxy server extracts the original username from the composite string of upstream hostname and original username supplied by the client device 102.

After the client device 102 has connected, but before it has authenticated, the SMTP proxy server responds to commands based on its own capabilities, independently of any message server 106. After a client device 102 has provided credentials, and the message server 106 has successfully authenticated the user, the SMTP proxy server forwards the client device's commands to the message server 106, and forwards the message server's responses to the client device 102.

Following a DATA command from the client device 102, the SMTP proxy server accepts the subsequent message in Internet Message Format, and passes it to the message transcoding layer, discussed herein, indicating that it is dealing with an outbound message sent by the user (rather than an inbound message received by the user). The resulting modified message is sent to the message server 106 with the forwarded DATA command.

Message Transcoding

Figure 7A:
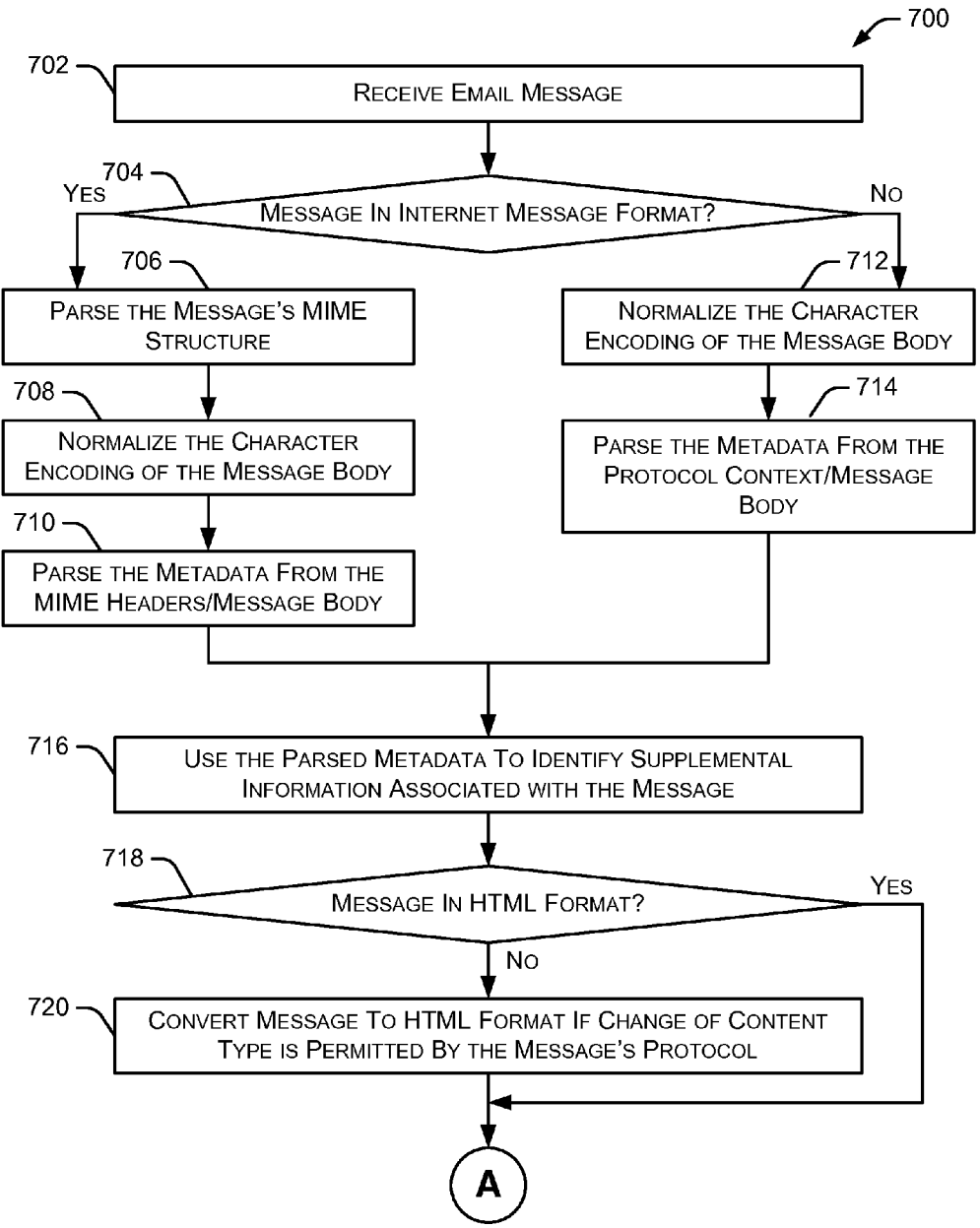
FIGS. 7A and 7B illustrate a flow diagram of a method, in accordance with an embodiment, of transcoding messages.
Figure 7B:
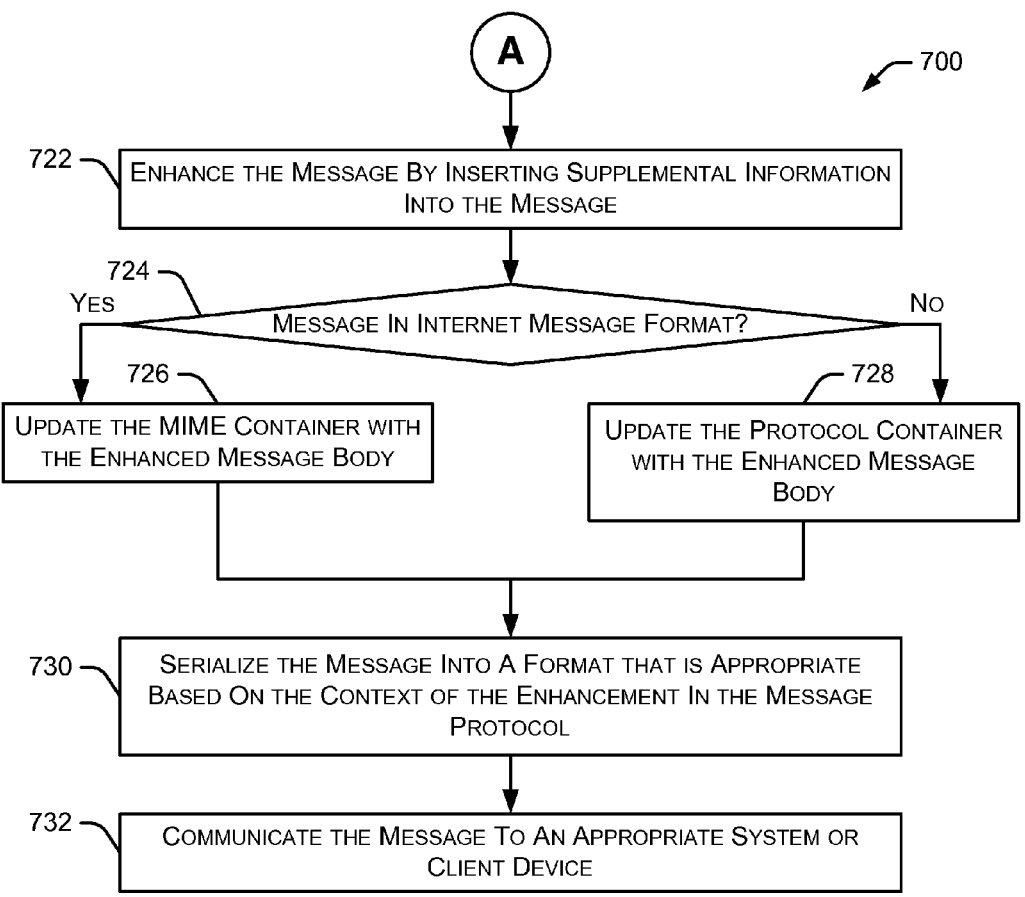

FIGS. 7A and 7B illustrate a flow diagram of a method 700, in accordance with an embodiment, of transcoding messages. In some embodiments, at least a portion of the method 700 is performed by the proxy server 104, discussed herein. Initially, an email message is received at 702. The method 700 determines whether the message is in Internet message format at 704. If the message is in Internet message format, the message's MIME structure is parsed at 706. The method 700 also normalizes the encoding of the message body at 708 and parses the metadata from the MIME headers and/or the message body at 710. If the message is determined not to be in Internet message format at 704, the method 700 normalizes the character encoding of the message body at 712 and parses the metadata from the protocol context and/or the message body at 714.

The method 700 continues by using the parsed metadata to identify supplemental information associated with the message at 716. This may involve communicating with any number of supplemental information servers 108 or data sources 118. The method 700 then determines whether the message is in HTML format at 718. If the message is not in HTML format, the method 700 converts the message to HTML format if a change of content type is permitted by the message's protocol at 720. The method 700 enhances the message by inserting supplemental information into the message at 722.

The message determines, at 724, whether the message is in Internet message format. If the message is in Internet message format, the method 700 updates the MIME container with the enhanced message body at 726. If the message is not in Internet message format, the method 700 updates the protocol container with the enhanced message body at 728. The method 700 continues by serializing the message into a format that is appropriate based on the context of the enhancement in the message protocol at 730. Finally, the message is communicated to an appropriate system or client device at 732.

The following example presents a specific embodiment of a message transcoding procedure. A message transcoding and enhancement layer accepts as input an email message, extracted from one of the email protocol proxy servers 104 described herein. As a minimum, the proxy server 104 supports Internet Message Format, plain text, and HTML as input and output formats. In the case of plain text and HTML input, the proxy server 104 allows the character encoding and related header fields (such as the sender and recipient email addresses of the message) to be specified. In the case of Internet Message Format, that information is contained within the header fields of the message. The proxy server 104 supports two distinct modes of operation: inbound (a message received by the user) and outbound (a message sent by the user). In the case of inbound messages, details of the authenticated user account, the client device type, and the client software version are also specified.

If the message to be transcoded is in Internet Message Format, its MIME structure is parsed, as described in RFCs 2045, 2046, 2047 and 2049. In the case of multipart messages, the body parts that are displayed by clients are identified (i.e., parts that are not attachments, or less preferable multipart/alternative versions, etc.). These visible body parts are typically either in plain text or in HTML format, and they may be processed in the same way as messages that were provided to the transcoding layer as plain text or HTML, as described below.

Once the message body is in plain text or HTML, its character encoding is normalized, in order to facilitate the modification of the message with data from other sources. In some embodiments, UTF-8 (UCS Transformation Format-8 bit) is used for character encoding, as many character encodings can be converted into UTF-8 losslessly, and it is supported by a variety of client devices. The message body, and the metadata obtained from message headers or the email protocol (such as the email addresses of the sender and the recipients), are parsed and used to query any number of databases or services to find information that may be used to enhance the message. Such queries may consider data specific to the authenticated user.

Next, the message body is analyzed for any existing enhancements, or fragments of enhancements, contained within the message (for example, as contained in a quoted reply in the case of an outbound message). Such enhancement may be recognized by certain element IDs or class names used in the HTML source, or by certain invisible unicode character sequences in the text, or any other distinctive feature appropriate to the application. Such existing enhancements may be deleted from the message, or replaced with alternative representations, as appropriate.

Next, if the message is in plain text and if the transcoding is performed in a context that allows use of HTML instead of plain text, then the plain text message is converted to equivalent HTML. Since line breaks are ignored in HTML, line breaks in the plain text message are converted into explicit line break or paragraph elements in the HTML conversion. To allow reflow of the message text on screens of different sizes, the conversion may insert explicit line breaks for those new lines that were explicitly entered by the user, and not for line breaks that were introduced by the sender's client by wrapping a long paragraph into multiple lines.

Next, using the results of the database and service queries described above, the message is enhanced. This is done by inserting content into the message at any number of points. If the message is in plain text and cannot be converted into HTML, these modifications are made in plain text, and may be differentiated from the rest of the message using punctuation or other symbols. Otherwise, the modifications are made by adding HTML elements, which may be styled, for example, using CSS (cascading style sheets), and may include images, links, and any other content appropriate to the application. Any actions that the user may take can be represented as links to websites, other applications or other kinds of external references.

The same enhancement information may be expressed and represented in different forms, structures or styles. When modifying the message, the enhancement process may take into account the context when choosing which expression of the information to insert into the message. In particular embodiments, on inbound messages, the knowledge of the client device type and client software version may be used to render a representation tailored to the screen size, visual style, hardware and software capabilities, and other characteristics of that client device (for example, CSS animations may be employed if they are supported by the client device). On outbound messages, the representation of information inserted into the message can be optimized for compatibility with a wide range of different email clients, since it is not known on which client device or client software the message will be read.

Interactive user interfaces may be created within the modified message by taking advantage of certain device capabilities. For example, parts of the user interface may be made visible at the user's request by using CSS :hover, :active and :focus pseudo-classes, even in environments where execution of JavaScript is not permitted. Animated graphics formats and other techniques may also be used. Since these capabilities are typically present on some models of client device 102, they will typically be generated on inbound messages where the client device type and software version is known to the message transcoding process.

For messages in Internet Message Format, in addition to inserting content into the HTML body part, it may be appropriate to add further MIME parts to the message, such as using the multipart/related container type. This can be used to include images in the message such that they can be referenced in the HTML part, and displayed by clients without needing to download any external resources. For multipart/related containers that cannot be nested, any existing container should be reused if it exists. If it does not exist, a multipart/related container can be inserted at the position of the HTML body part in the MIME tree, and the HTML body part is made a child of that container.

After these enhancements have taken place, the message is serialized into a format most suitable to the context of the enhancement in the email protocol, which may be plain text, HTML or Internet Message Format. In this re-serialization, information present in the original message is kept intact as much as possible. For example, attachments are preserved and not modified. Also, certain clients may include HTML structures or character encodings that are not standards-compliant. To minimize unintended side-effects of the proxy server on the user's email experience, such structures are preserved as far as possible. If any unrecoverable error occurs during the enhancement process, some embodiments revert to using the unenhanced message. The serialized enhanced message is returned to the email protocol proxy server from which it came, and embedded into the communication stream.

In some embodiments, the message transcoding and enhancement process replaces one message with a completely different message. For example, this may be appropriate for messages sent by the operator of the proxy server itself. When viewed on an email account that is not using the proxy server, such a message could include instructions on how to set up the proxy server configuration. However, when downloaded by a client that is already configured to use the proxy server, it could notify the user of a successful configuration.

Figure 9:
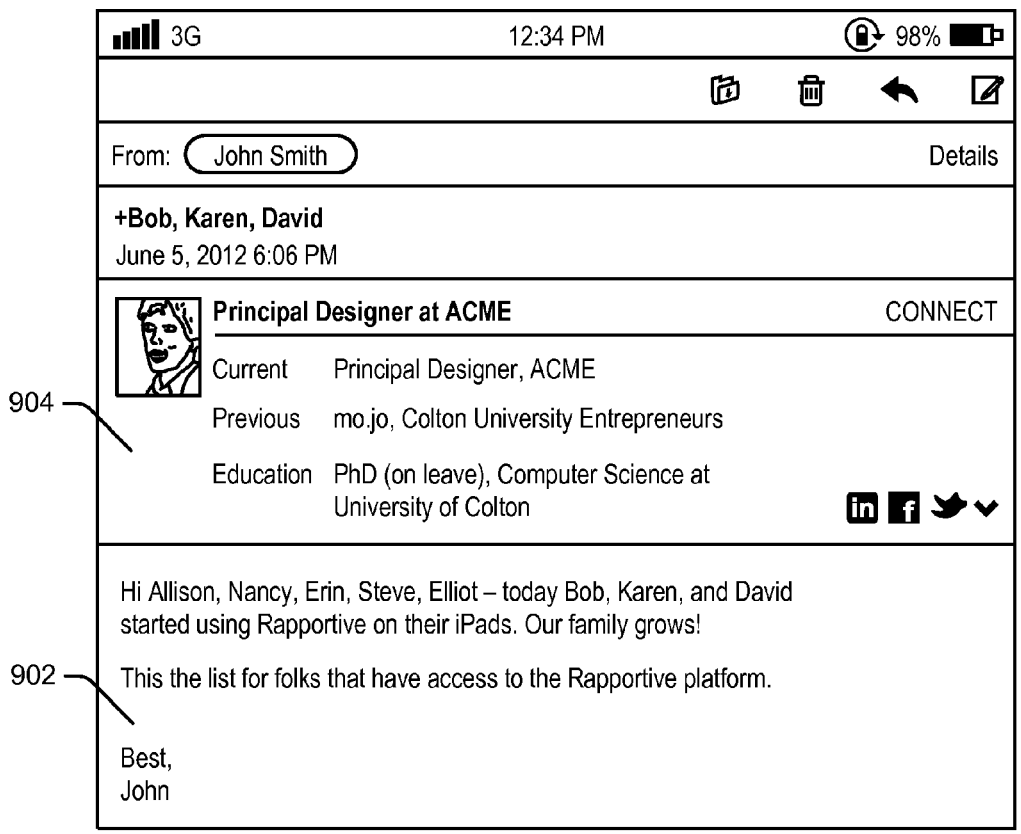
FIGS. 9-12 depict, in accordance with example embodiments, portions of user interfaces displaying various messages and supplemental information.

FIGS. 9-12 depict, in accordance with example embodiments, portions of user interfaces displaying various messages and supplemental information. FIG. 9 illustrates an example email message received from a sender "John Smith." In addition to the email message 902, the original message has been modified to include supplemental information 904 associated with John Smith. In this example, the supplemental information 904 includes a picture of John Smith, employment information associated with John Smith, as well as his educational experience. The supplemental information 904 also provides links to connect with John Smith on various social networks.

Figure 10:

In some embodiments, the user may activate a button in order to expand the supplemental information displayed in the message. FIG. 10 illustrates the email message of FIG. 9 after the supplemental information has been expanded. In the example of FIG. 10, additional supplemental information associated with John Smith is shown, including various networks used by John Smith. The recipient of the email message can activate any of the network names or icons to initiate a network connection with John Smith or to learn more about his activity on each network. Further, the email message shown in FIG. 10 identifies several users connected with both the email recipient and John Smith. These common connections may provide credibility and/or context regarding the email content to the email recipient.

Figure 11:
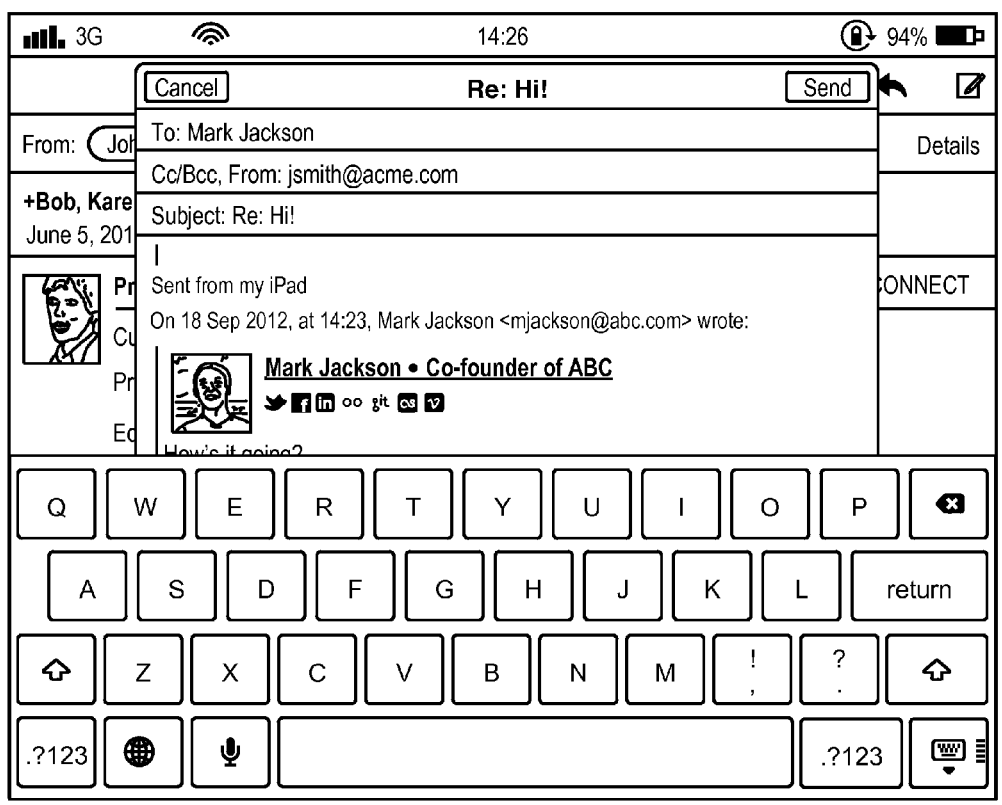

FIG. 11 illustrates an example email message being prepared by John Smith and sent to Mark Jackson, the email recipient. In this example, supplemental information associated with Mark Jackson is automatically inserted into the email message as it is created by John Smith. Displaying this supplemental information to the user creating the message provides confirmation that the correct email recipient has been selected.

Figure 12:
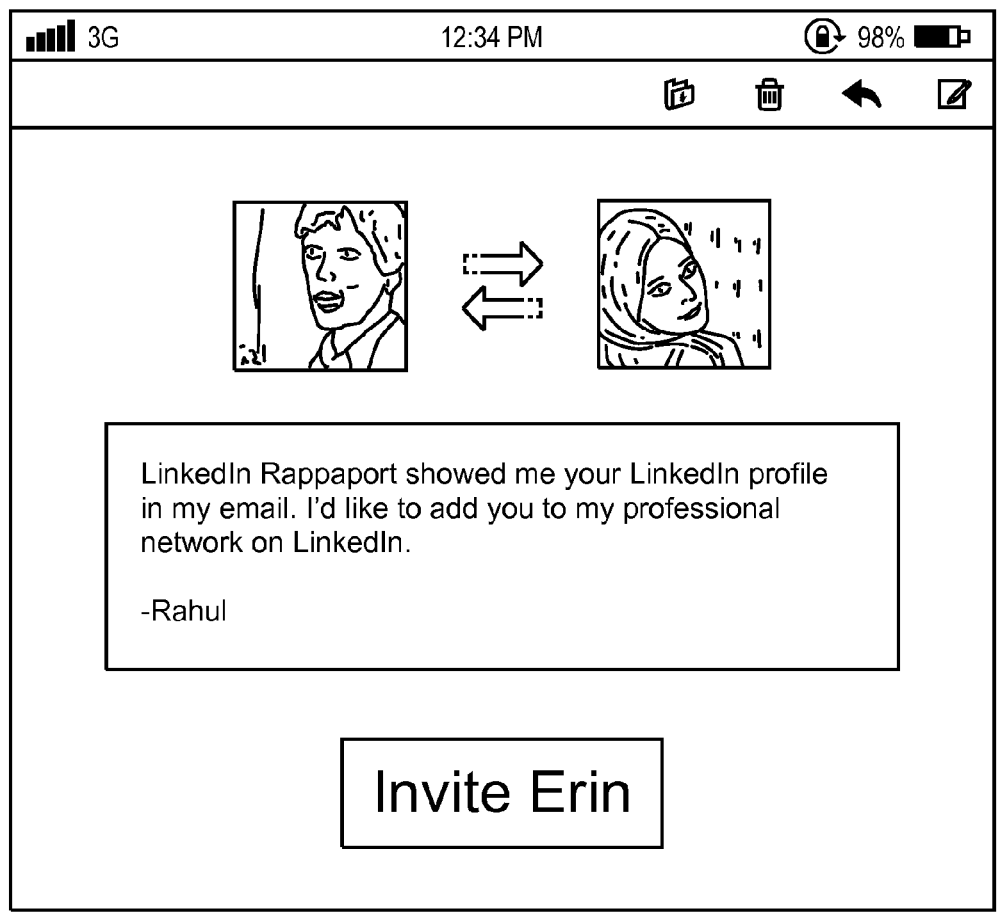

FIG. 12 illustrates an example portion of a user interface that displays an invitation to join another user's network. In some embodiments, an email recipient will see supplemental information inserted into the received email message. The email recipient can activate one of the links or icons included in the email message to invoke an invitation dialog, such as the example in FIG. 12. The email recipient may optionally write a message to the other user, and can then choose to invite the other user to join their network.

Figure 13:
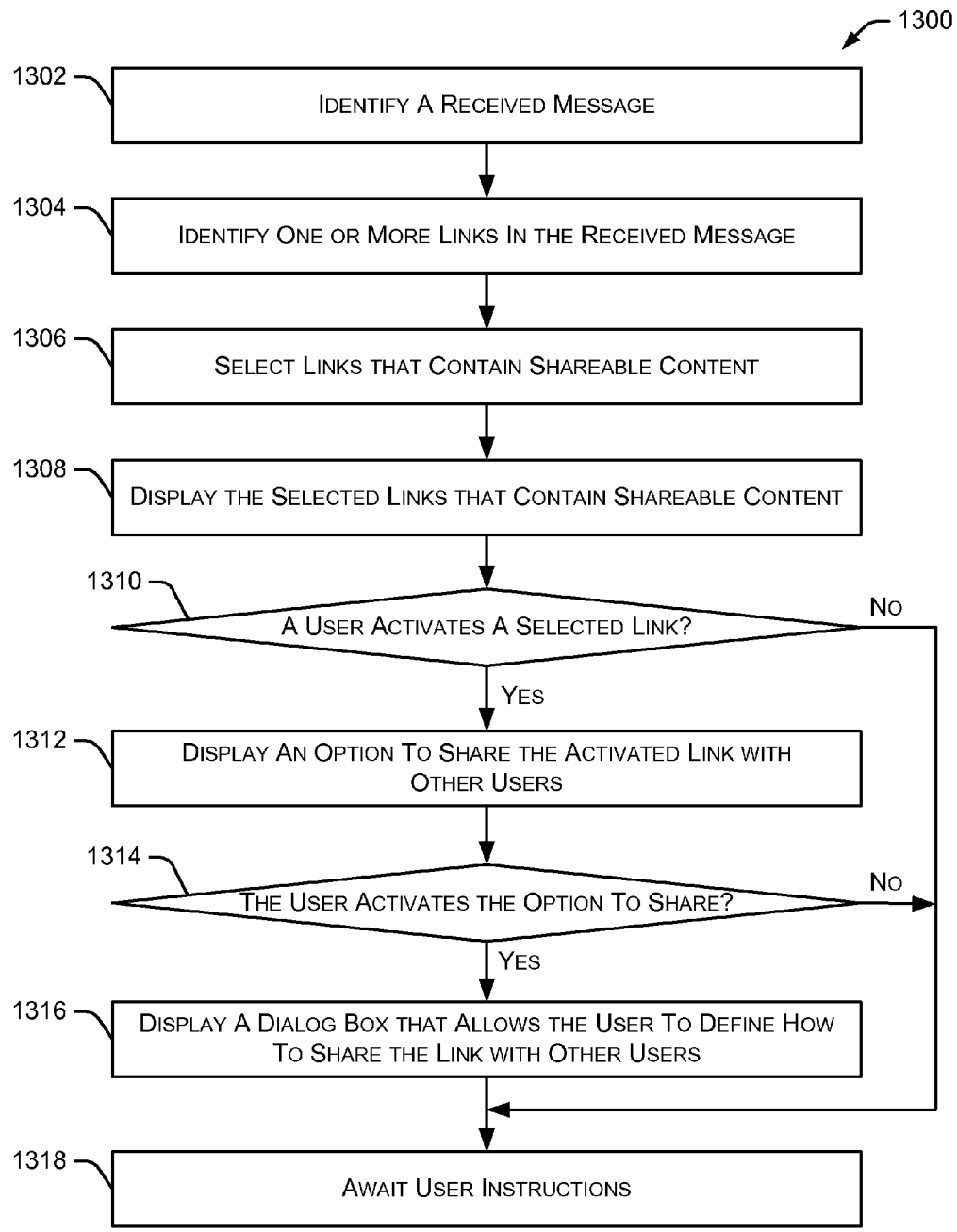
FIG. 13 is a flow diagram of a method, in accordance with an embodiment, of sharing links contained in a message.

FIG. 13 is a flow diagram of a method 1300, in accordance with an embodiment, of sharing links contained in a message, such as an email message. Initially, the method 1300 identifies a received message at 1302 and identifies one or more links in the received message at 1304. The method 1300 selects links in the received message that contain shareable content at 1306. Example shareable content includes content that is publicly accessible and/or would be relevant to another user. A specific example of a shareable link is a link to an online article that is publicly accessible to other users. The links that contain shareable content are displayed to a user at 1308. The user may choose to activate one or more of the selected links at 1310. If the user activates at least one of the selected links, the method 1300 displays an option to share the activated link with other users at 1312. If the user activates the option to share the activated link at 1314, the method 1300 displays a dialog box that allows the user to define how to share the link with other users at 1316. For example, the user may share the link via email, a social network connection, and the like. After displaying the dialog box, the method 1300 awaits further user instructions at 1318.

Figure 14:
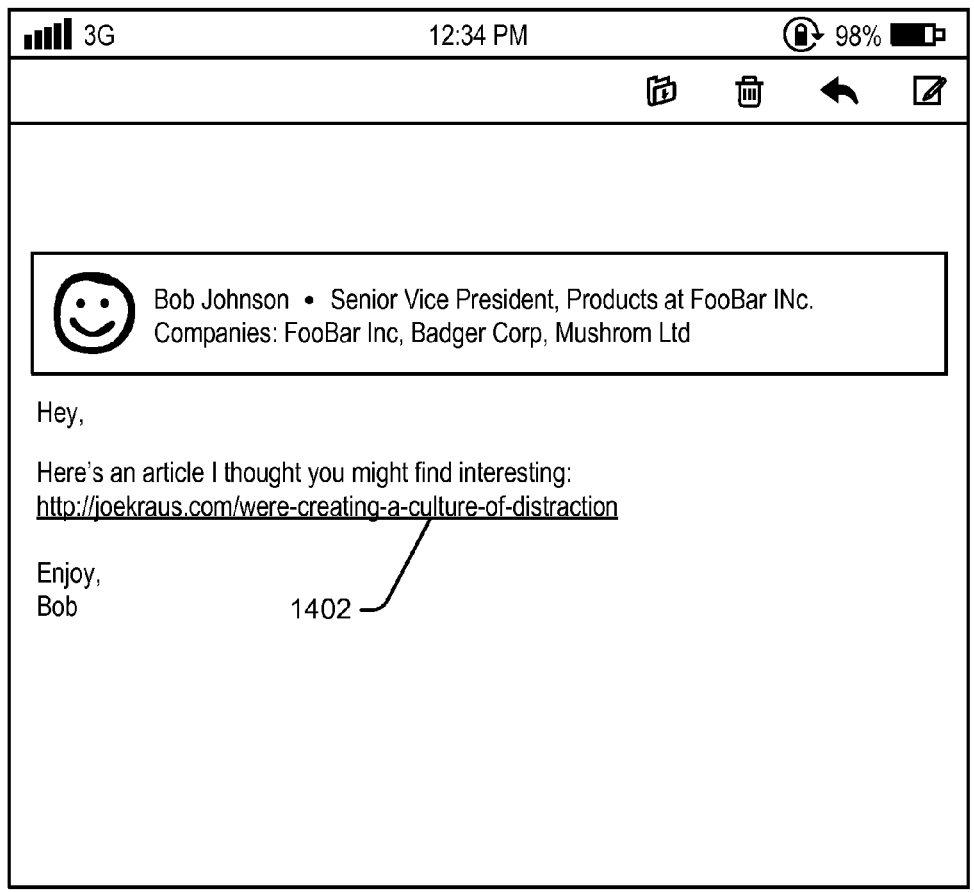
FIGS. 14-16 depict, in accordance with example embodiments, portions of user interfaces displaying the sharing of links in a message with other users.
Figure 15:
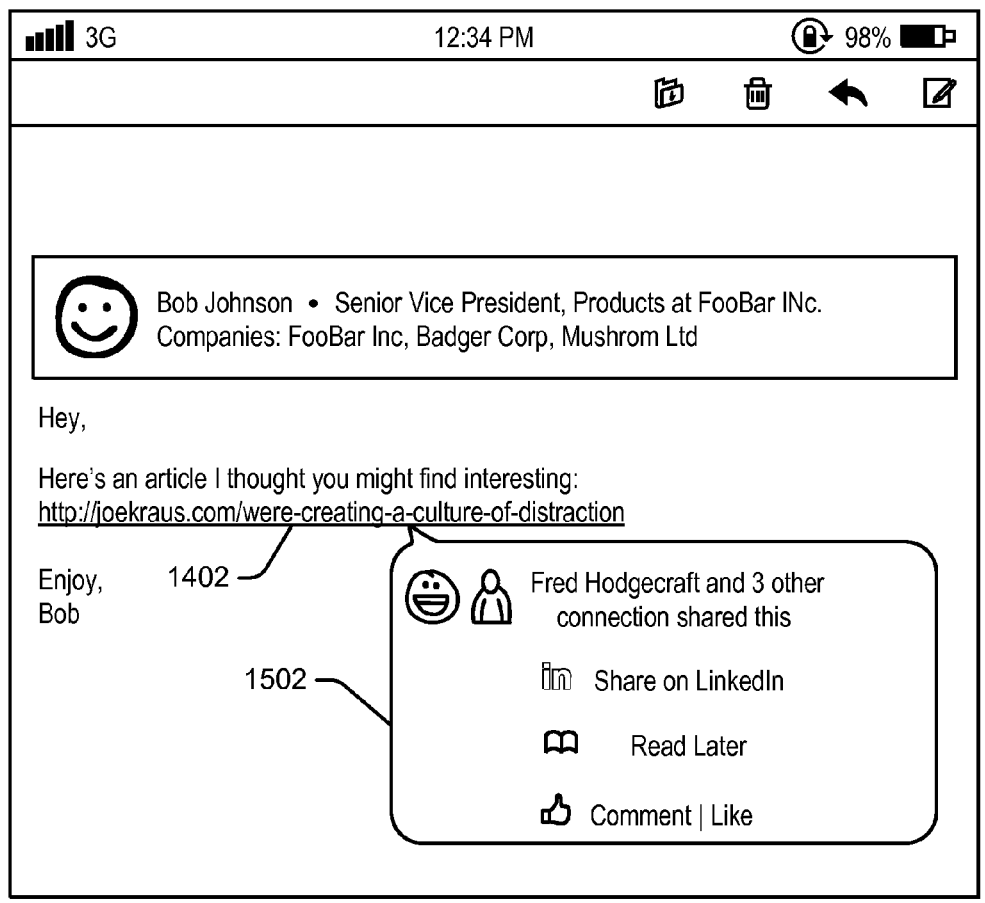
Figure 16:
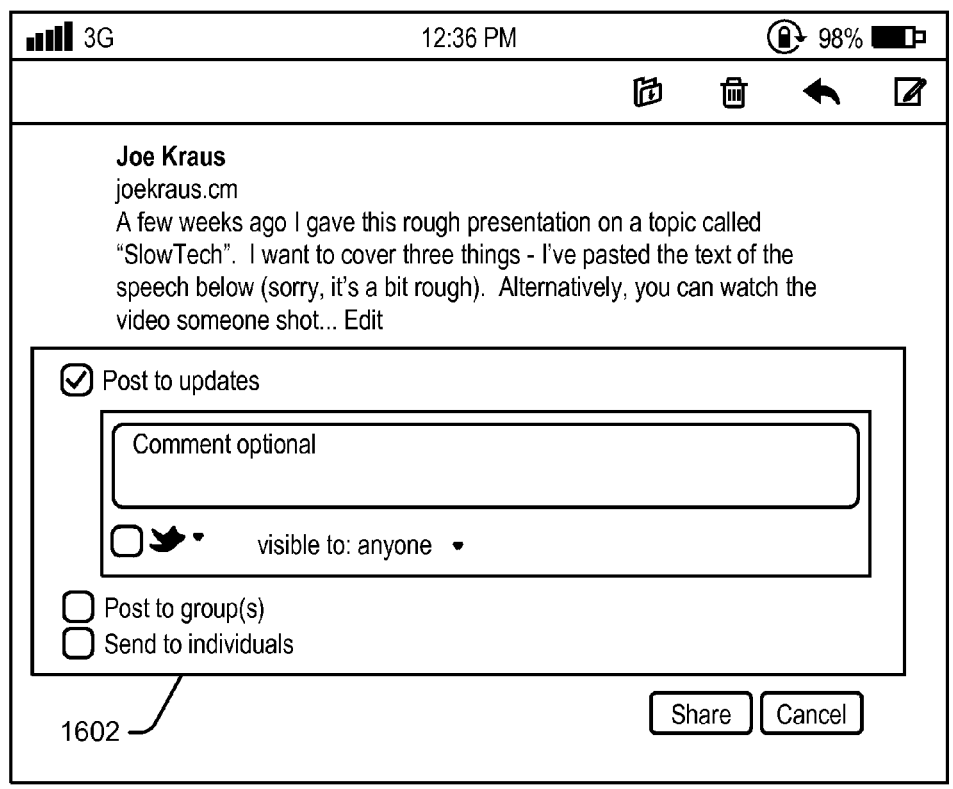

FIGS. 14-16 depict, in accordance with example embodiments, portions of user interfaces displaying the sharing of links in a message with other users. FIG. 14 illustrates an example email message that includes a link to an article 1402. When the recipient of the email message hovers over the link 1402 (or otherwise identifies the link 1402), the user interface displays one or more options as shown by way of example in FIG. 15. In the example of FIG. 15, the user interface displays a dialog box 1502 that identifies other users (e.g., network connections) who have shared the same link 1402 with others. Additionally, the dialog box 1502 identifies options to share the link 1402 via a social network or other connection mechanism, mark the link 1402 for visiting/reading at a future time, comment on the link 1402, and like the content of the link 1402. In alternate embodiments, any number of different options may be presented to a user for sharing, saving or otherwise managing the link 1402.

FIG. 16 illustrates an example email message including a dialog box 1602 that allows a user to post comments to a social network, a group or to one or more individuals. The comments may be related to the email message content, a link in the email message, an email attachment, a topic mentioned in the email message content, and the like.

Figure 17:
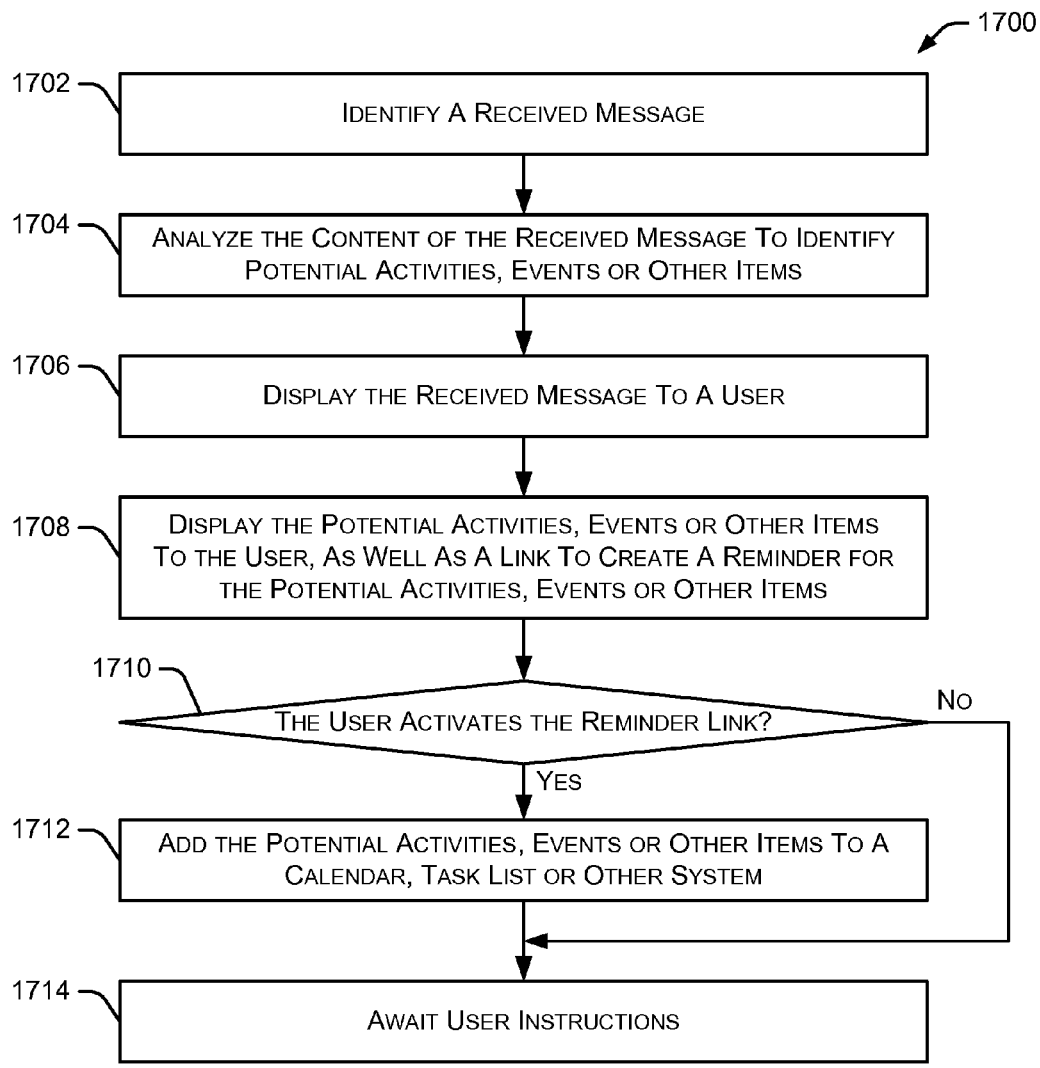
FIG. 17 is a flow diagram of a method, in accordance with an embodiment, of generating a reminder associated with information contained in one or more messages.

FIG. 17 is a flow diagram of a method 1700, in accordance with an embodiment, of generating a reminder associated with information contained in one or more messages. Initially, the method 1700 identifies a received message at 1702 and analyzes the content of the received message to identify potential activities, events or other items contained in the received message at 1704. The potential activities, events or other items include meetings, conferences, phone calls, personal activities, project deadlines, tasks, and the like. The method 1700 displays the received message to a user at 1706. Additionally, the method 1700 displays the potential activities, events or other items to the user as well as a link to create a reminder for the potential activities, events or other items at 1708. If the user chooses whether to activate the reminder link at 1710, the potential activities, events or other items are added to a calendar, task list, or other system/application at 1712. For example, if the potential activity is a meeting, the method 1700 may automatically add the meeting to the user's calendar program in response to the user activation of the reminder link. Finally, the method 1700 awaits further user instructions at 1714.

Figure 18:
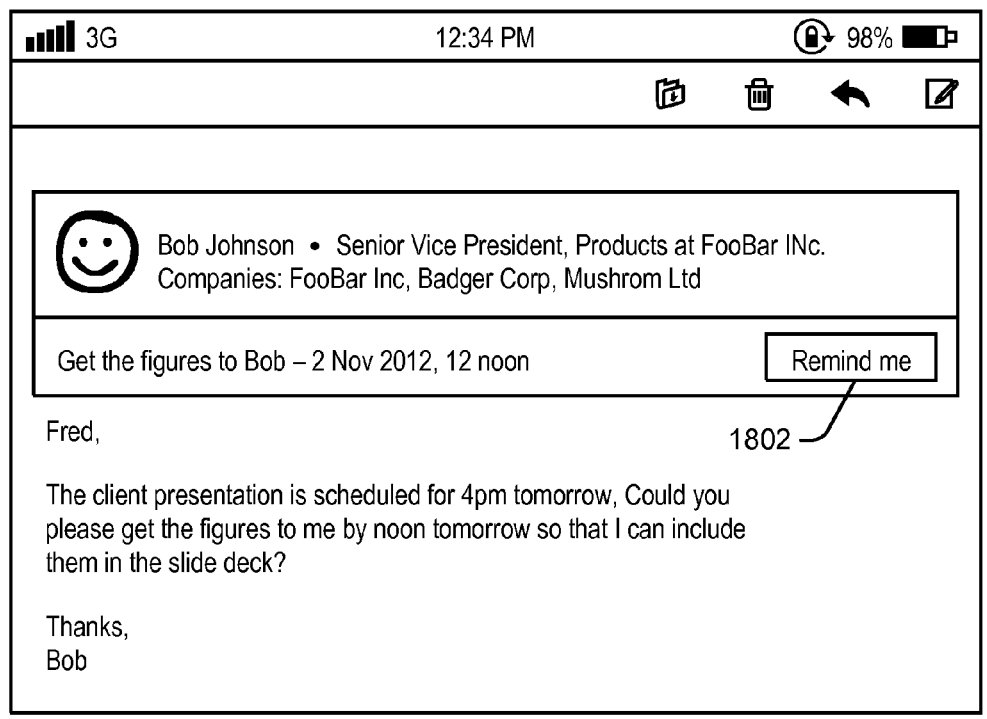
FIG. 18 depicts, in accordance with example embodiments, a portion of a user interface displaying an option to set a reminder associated with information contained in a message.

FIG. 18 depicts, in accordance with example embodiments, a portion of a user interface displaying an option to set a reminder associated with information contained in a message. The example email message content shown in FIG. 18 includes "Could you please get the figures to me by noon tomorrow so that I can include them in the slide deck?" Based on this email message content, an application or system determines that the email recipient may want to set a reminder for the next day at noon. Accordingly, the application or system displays a "remind me" button or link 1802 that allows the email recipient to set a reminder to provide the requested information by noon the next day. If the email recipient activates the button or link 1802, the reminder is automatically entered in the email recipient's calendar, task list or other task management application.

Figure 19:
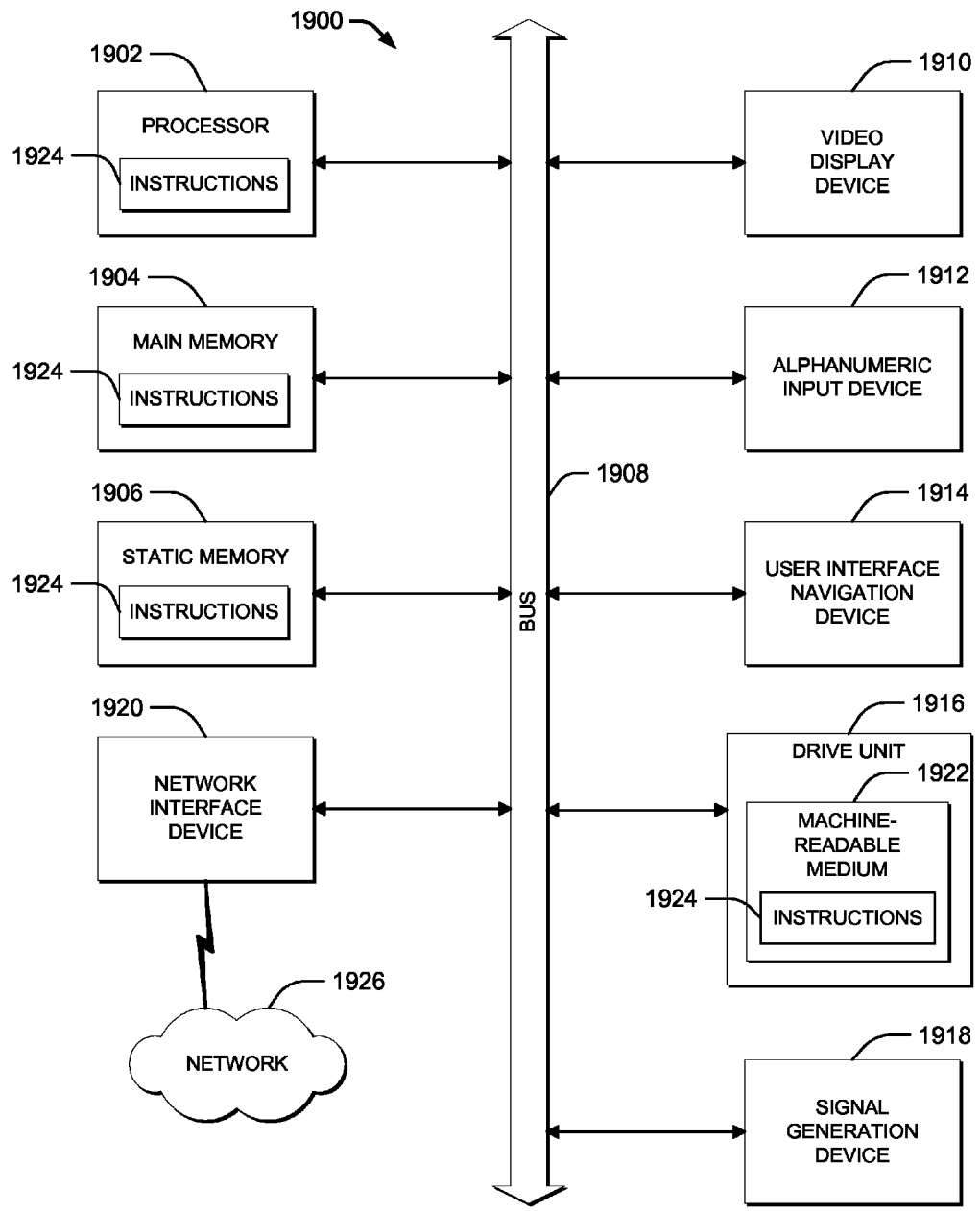
FIG. 19 is a block diagram of a machine in the example form of a computer system within which a set of instructions, for causing the machine to perform any one or more of the methodologies discussed herein, may be executed.

FIG. 19 is a block diagram of a machine in the example form of a computer system 1900 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

Example computer system 1900 includes a processor 1902 (e.g., a central processing unit (CPU), a graphics processing unit (GPU) or both), a main memory 1904, and a static memory 1906, which communicate with each other via a bus 1908. Computer system 1900 may further include a video display device 1910 (e.g., a liquid crystal display (LCD) or a cathode ray tube (CRT)). Computer system 1900 also includes an alphanumeric input device 1912 (e.g., a keyboard), a user interface (UI) navigation device 1914 (e.g., a mouse), a disk drive unit 1916, a signal generation device 1918 (e.g., a speaker) and a network interface device 1920.

Disk drive unit 1916 includes a machine-readable medium 1922 on which is stored one or more sets of instructions and data structures (e.g., software) 1924 embodying or utilized by any one or more of the methodologies or functions described herein. Instructions 1924 may also reside, completely or at least partially, within main memory 1904, within static memory 1906, and/or within processor 1902 during execution thereof by computer system 1900, main memory 1904 and processor 1902 also constituting machine-readable media.

While machine-readable medium 1922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 1924 may further be transmitted or received over a communications network 1926 using a transmission medium. Instructions 1924 may be transmitted using network interface device 1920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader scope of the invention. For example, the described systems and methods may provide an educational benefit in other disciplines that by providing incentives for users to access the systems and methods. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
   establishing a connection to a proxy server, the proxy server configured to receive messages from a message server;
   receiving a message from the proxy server;
   identifying a network link contained in the received message, the network link associated with shareable content;
   modifying, in response to identifying the network link, using one or more processors, the received message to indicate, to a user of a client device, an option to share the network link with at least one recipient via a social network, wherein sharing the network link via the social network includes posting the network link on an update feed of the user for at least one recipient to view the network link, the option to share the network link presented without following the network link; and
   communicating the modified message to the client device; and
   receiving an indication from the client device that the user selected the option to share the network link with at least one recipient.

2. The method of claim 1, further comprising:
   receiving an indication from the client device that defines how to share the network link with the at least one recipient.

3. The method of claim 2, further comprising sharing the network link with the at least one recipient.

4. The method of claim 2, further comprising communicating to the client device an identification of a plurality of available communication media to share the network link.

5. The method of claim 2, further comprising communicating to the client device an option to comment on the network link.

6. The method of claim 1, further comprising receiving an indication from the client device that identifies the at least one recipient.

7. The method of claim 1, further comprising communicating to the client device an option to mark the network link for future access by the user.

8. The method of claim 1, the received message including at least one of an email message, a social media message, a newsgroup message, a calendar synchronization message, a voicemail message, a text message, an address book entry, an audio message, and a video message.

9. The method of claim 1, the identifying of the network link contained in the received message including determining whether the network link is associated with shareable content.

10. The method of claim 1, further comprising:
determining a device type associated with the client device; and
adjusting a display size of the modified message based on the device type.

11. The method of claim 1, further comprising:
determining a device type associated with the client device; and
adjusting a formatting of the modified message based on the device type.

12. The method of claim 1, the at least one recipient including at least one of an individual user, a group of users, connections on the social network, and all public users.

13. A computer-implemented method comprising:
establishing a connection to a proxy server, the proxy server configured to receive messages from a message server;
receiving a message from the proxy server;
identifying an indication of an option to share a network link contained in the received message;
causing display of the option to share the network link via a social network to a user without following the network link wherein sharing the network link via the social network includes posting the network link on an update feed of the user for at least one recipient to view the network link;
determining, using one or more processors, whether the user selected the option to share the network link; and
responsive to determining that the user selected the option to share the network link, communicating the determination to the proxy server; and
receiving an indication from the client device that the user selected the option to share the network link with at least one recipient.

14. The method of claim 13, further comprising determining a second user with which the network link will be shared.

15. The method of claim 14, the second user being identified by the user.

16. The method of claim 13, the option to share a network link including identification of a plurality of available communication media to share the network link.

17. The method of claim 13, further comprising:
identifying an indication of an option to comment on the network link contained in the received message; and
causing display of the option to comment on the network link to a user.

18. The method of claim 13, further comprising:
identifying an indication of an option to mark the network link for future access by the user; and
causing display of the option to mark the network link to a user.

19. An apparatus comprising:
a memory to store data associated with messages received from a proxy server; and
one or more processors coupled to the memory, the one or more processors configured to:
receive a message from the proxy server;
identify a network link contained in the received message, the network link associated with shareable content;
modify the received message to indicate, to a user of a client device, an option to share the network link with at least one recipient via a social network, wherein sharing the network link via the social network includes posting the network link on an update feed of the user for at least one recipient to view the network link, the option to share the network link presented without following the network link; and
communicate the modified message to the client device; and
receive an indication from the client device that the user selected the option to share the network link with at least one recipient.

20. The apparatus of claim 19, the one or more processors further configured to share the network link with the at least one recipient.

* * * * *